United States Patent
DeJong, II et al.

(10) Patent No.: US 10,017,211 B1
(45) Date of Patent: Jul. 10, 2018

(54) WORK VEHICLE

(71) Applicant: KOMATSU LTD., Tokyo (JP)

(72) Inventors: Raymond E. DeJong, II, Chattanooga, TN (US); Noah Holcomb, Chattanooga, TN (US); William H. Schierschmidt, Chattanooga, TN (US)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/680,612

(22) Filed: Aug. 18, 2017

(51) Int. Cl.
| | |
|---|---|
| *B62D 25/12* | (2006.01) |
| *A01G 23/081* | (2006.01) |
| *E02F 9/08* | (2006.01) |

(52) U.S. Cl.
CPC ............ *B62D 25/12* (2013.01); *A01G 23/081* (2013.01); *E02F 9/0891* (2013.01)

(58) Field of Classification Search
CPC ...... B62D 25/10; B62D 25/12; A01G 23/081; E02F 9/0891
See application file for complete search history.

(56) References Cited

U.S. PATENT DOCUMENTS

| | | | | |
|---|---|---|---|---|
| 3,487,887 A | * | 1/1970 | Pensa | B62D 25/10 16/361 |
| 4,583,908 A | | 4/1986 | Crawford | |
| 5,339,494 A | | 8/1994 | Esau et al. | |
| 5,645,134 A | * | 7/1997 | Frankel | B62D 25/10 16/277 |
| 9,004,212 B2 | * | 4/2015 | Noda | B66C 13/52 16/348 |
| 9,403,474 B2 | | 8/2016 | Kaatrasalo et al. | |
| 9,677,249 B2 | * | 6/2017 | Holcomb | E02F 9/0891 |
| 2009/0230710 A1 | * | 9/2009 | Cech | B62D 25/10 296/24.3 |
| 2012/0255801 A1 | * | 10/2012 | Shimada | B62D 25/10 180/69.2 |

(Continued)

FOREIGN PATENT DOCUMENTS

EP     3 097 771 A1     11/2016

OTHER PUBLICATIONS

Forest Research: The Research Agency of the Forestry Commission titled CCF Harvesting Method Development: Harvester Head Visibility, No. 1200A/56/07, dated Aug. 2008, Project leader: Duncan Ireland and Gary Kerr.

(Continued)

*Primary Examiner* — Brian L Swenson
(74) *Attorney, Agent, or Firm* — Global IP Counselors, LLP

(57) ABSTRACT

A work vehicle includes a ground propulsion apparatus, a chassis supported by the ground propulsion apparatus, a vehicle body supported by the chassis, a vehicle cover movably mounted to the vehicle body to move between a closed position and an open position, and a guide. The vehicle body supports at least one serviceable component. The vehicle cover covers the at least one serviceable component in the closed position, and the vehicle cover permits access to the at least one serviceable component in the open position. The guide includes a first guide element attached to the vehicle body and a second guide element attached to the vehicle cover. The first and second guide elements cooperate with each other to guide the vehicle cover to an aligned location in the closed position.

18 Claims, 18 Drawing Sheets

(56) References Cited

U.S. PATENT DOCUMENTS

| | | | |
|---|---|---|---|
| 2014/0252785 A1* | 9/2014 | Kim | E02F 3/325 |
| | | | 292/338 |
| 2015/0023771 A1 | 1/2015 | Carr et al. | |
| 2015/0337954 A1 | 11/2015 | Storey | |
| 2016/0244111 A1 | 8/2016 | Schierschmidt et al. | |
| 2016/0244947 A1 | 8/2016 | Holcomb et al. | |

OTHER PUBLICATIONS

Tracked Feller Bunchers/Harvesters Brochure 803M/MH/853M/MH/859M/MH: John Deere, Feb. 2017.

* cited by examiner

WORK VEHICLE

BACKGROUND

Field of the Invention

The present invention generally relates to a work vehicle. More specifically, the present invention relates to a work vehicle having a movable vehicle cover and a guide that guides the vehicle cover.

Background Information

A work vehicle is a machine used in construction, mining, forestry, farming, etc. Such work vehicles typically have at least one work implement coupled to the vehicle body. The work implement is often movable but can be stationary in some cases. Such work vehicles include a ground propulsion apparatus that uses tracks or wheels to propel and/or steer the work vehicle. The tracks or wheels also serve to support the main body of the work vehicle. Such work vehicles typically have several serviceable components, which may need to be checked, inspected, serviced and/or repaired. Typical work vehicles have a hood or vehicle cover covering the serviceable components during normal operation. The hood or vehicle cover can be opened to gain access to the components. Examples of a work vehicles having a hood are disclosed in U.S. Pat. Nos. 5,339,494 and 7,967,094.

SUMMARY

It has been discovered that it can be cumbersome to open and close a vehicle cover and, thus, maintenance of and service access to components covered by the vehicle cover may be difficult.

Therefore, one object of the present invention is to provide a work vehicle which improves maintenance of and service access to components covered by the vehicle cover.

It has been further discovered that when a vehicle cover is closed after being open, the vehicle cover may not close to a desired position, an aligned position, or to a same position each time the vehicle cover is closed.

Therefore, another object of the present invention is to provide a work vehicle, which improves the closing of the vehicle cover so as to be in a desired position, an aligned position, and/or a same position each time.

It has been further discovered that when a vehicle cover is repeatedly opened and closed wear between cooperating elements may occur.

Therefore, yet another object of the present invention is to provide a work vehicle which reduces wear between cooperating components.

In view of the state of the known technology and in accordance with a first aspect of the present disclosure, a work vehicle is basically provided that comprises a ground propulsion apparatus, a chassis supported by the ground propulsion apparatus, a vehicle body supported by the chassis, a vehicle cover movably mounted to the vehicle body to move between a closed position and an open position, and a guide. The vehicle body supports at least one serviceable component. The vehicle cover covers the at least one serviceable component in the closed position, and the vehicle cover permits access to the at least one serviceable component in the open position. The guide includes a first guide element attached to the vehicle body and a second guide element attached to the vehicle cover. The first and second guide elements cooperate with each other to guide the vehicle cover to an aligned location in the closed position. One of the first and second guide elements includes at least one inclined guide surface, and the other of the first and second guide elements includes a roller.

In accordance with a second aspect of the present disclosure, a work vehicle is basically provided that comprises a ground propulsion apparatus, a chassis supported by the ground propulsion apparatus, a vehicle body supported by the chassis, a vehicle cover pivotally mounted to the vehicle body to pivot about a longitudinally extending pivot axis between a closed position and an open position, a latch releasably holding the cover in the closed position, and a guide. The vehicle body supports at least one serviceable component. The vehicle cover covers the at least one serviceable component in the closed position, and the vehicle cover permits access to the at least one serviceable component in the open position. The guide includes a first guide element attached to the vehicle body and a second guide element attached to the vehicle cover. The first and second guide elements cooperate with each other to guide the vehicle cover to an aligned location in the closed position. The latch is disposed closer to the longitudinally extending pivot axis than the guide.

In accordance with a third aspect of the present disclosure, a work vehicle is basically provided that comprises a ground propulsion apparatus, a chassis supported by the ground propulsion apparatus, a vehicle body supported by the chassis, a vehicle cover movably mounted to the vehicle body to move between a closed position and an open position, and a guide. The vehicle body supports at least one serviceable component. The vehicle cover covers the at least one serviceable component in the closed position, and the vehicle cover permits access to the at least one serviceable component in the open position. The guide includes a first guide element attached to the vehicle body and a second guide element attached to the vehicle cover. The first and second guide elements cooperate with each other to guide the vehicle cover to an aligned location in the closed position. The second guide element moves along a direction to an alignment position relative to the first guide element when the vehicle cover is moved to the aligned location in the closed position. At least one of the first and second guide elements is adjustable to adjust the alignment position of the second guide element relative to the first guide element along the direction.

Also other objects, features, aspects and advantages of the disclosed work vehicle will become apparent to those skilled in the work vehicle field from the following detailed description, which, taken in conjunction with the annexed drawings, discloses one embodiment of the work vehicle.

BRIEF DESCRIPTION OF THE DRAWINGS

Referring now to the attached drawings which form a part of this original disclosure:

FIG. 7 (B) shows a further enlarged perspective view of a roller mounted to the vehicle cover;

FIG. 15 (B) is a standalone back-side elevational view of the inclined guide as viewed in a longitudinal direction of the work vehicle showing a support rib on the back side of a guide plate of the inclined guide;

DETAILED DESCRIPTION OF THE EMBODIMENT(S)

Figure 1:
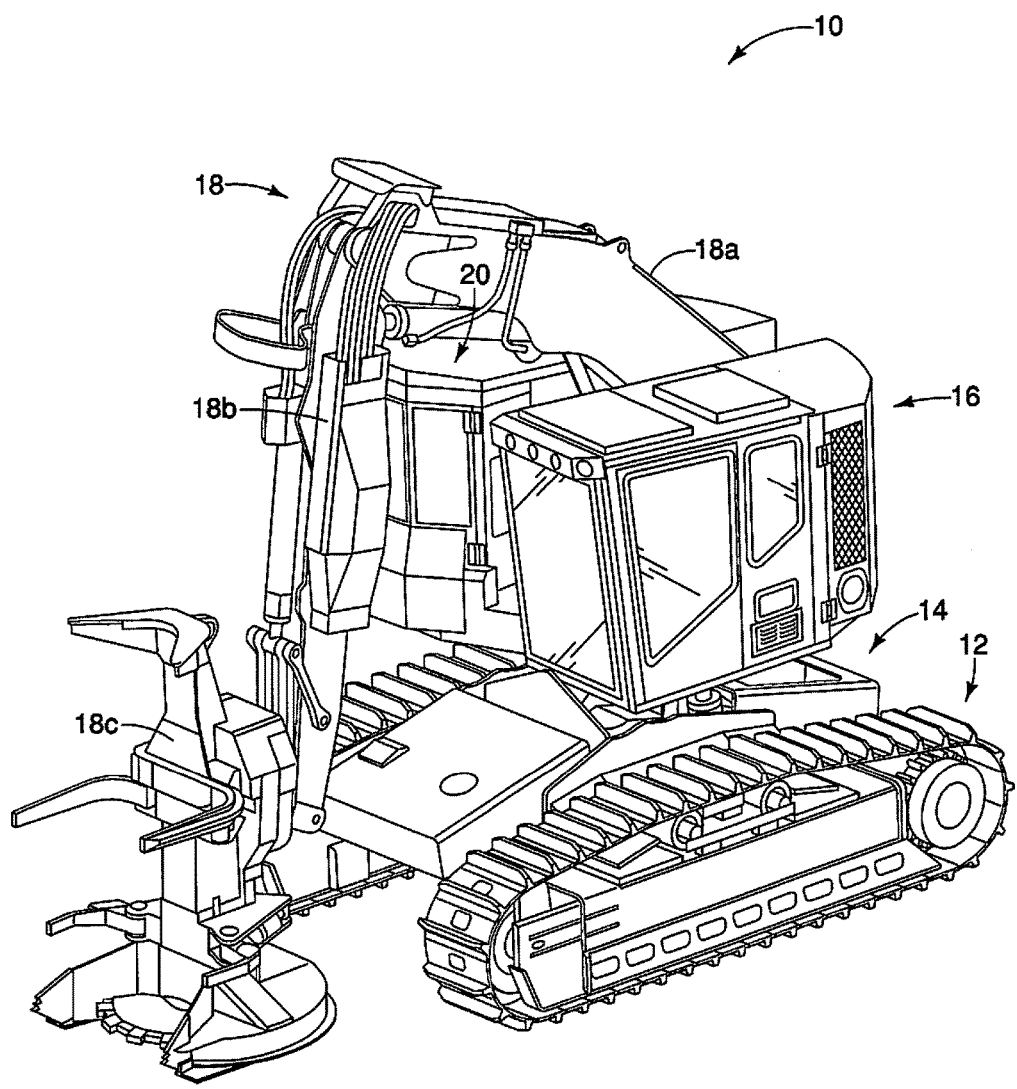
FIG. 1 is a right front side perspective view of a work vehicle in accordance with a first embodiment.
Figure 2:
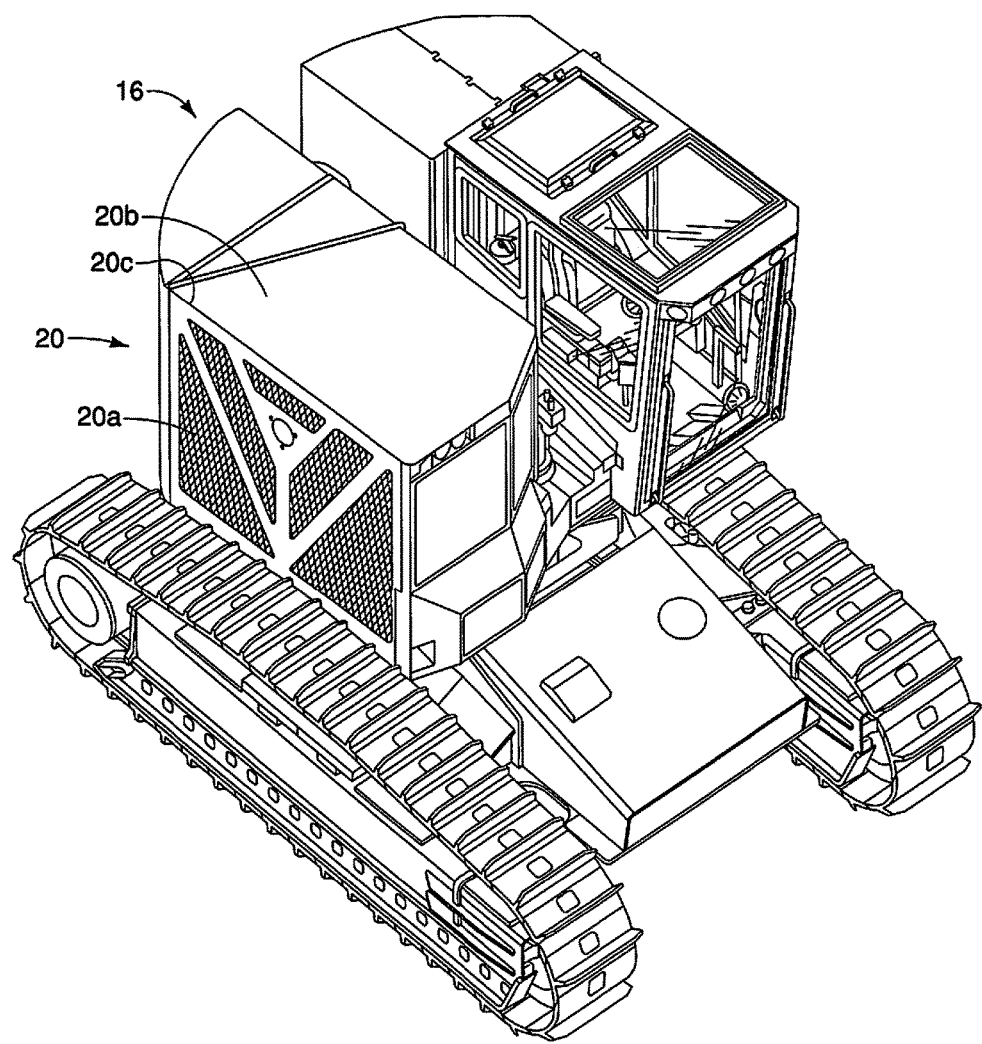
FIG. 2 is a left front side perspective view of the work vehicle illustrated in FIG. 1, with the work implement removed and with the vehicle cover in a closed position.
Figure 3:
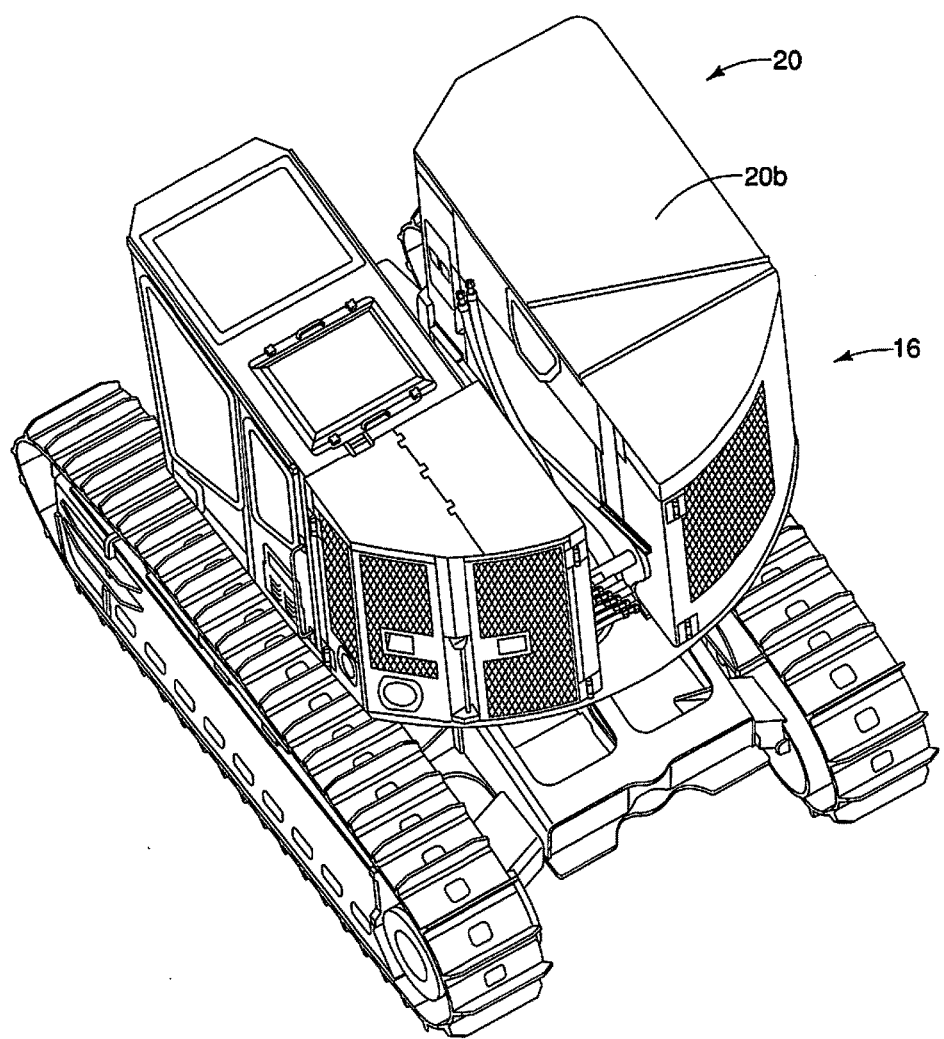
FIG. 3 is a rear perspective view of the work vehicle illustrated in FIG. 1, with the work implement removed and with the vehicle cover in the closed position (like FIG. 2)
Figure 4:
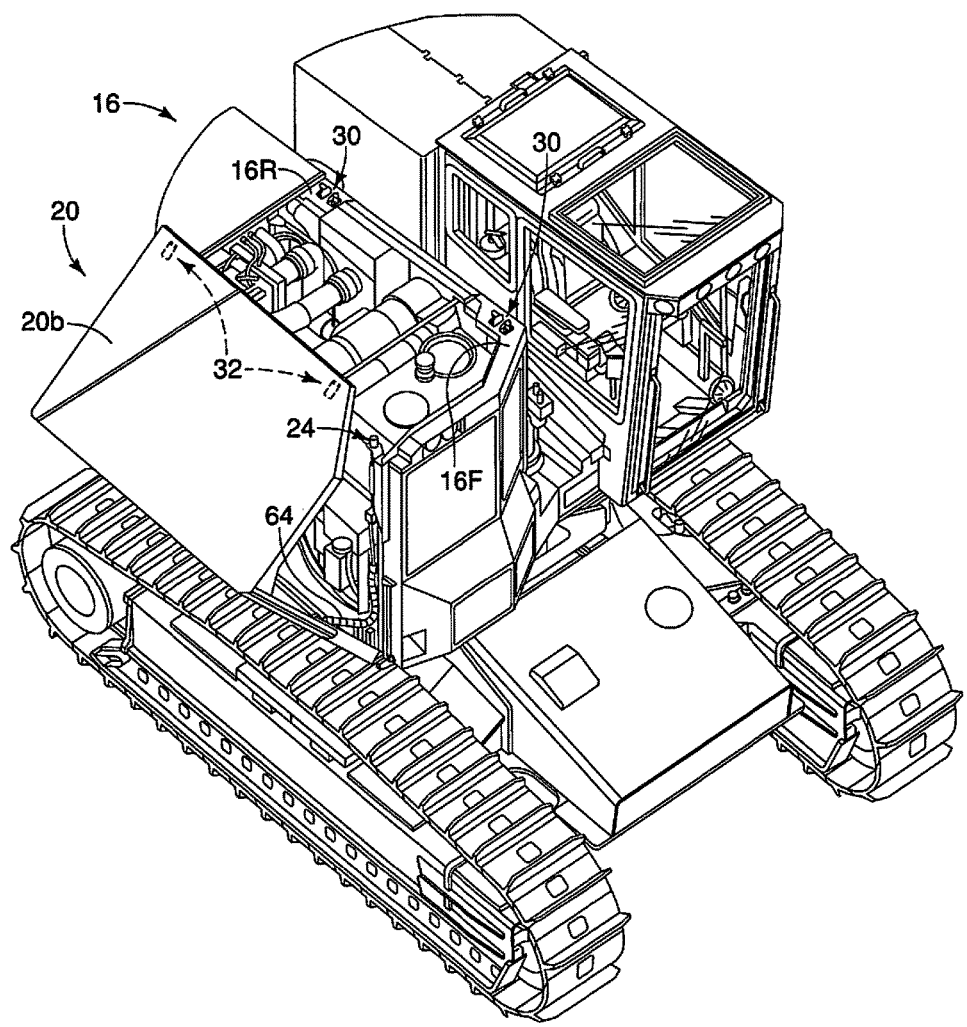
FIG. 4 is a left front side perspective view of the work vehicle illustrated in FIG. 1, with the work implement removed and with the vehicle cover in a partially open position.
Figure 5:
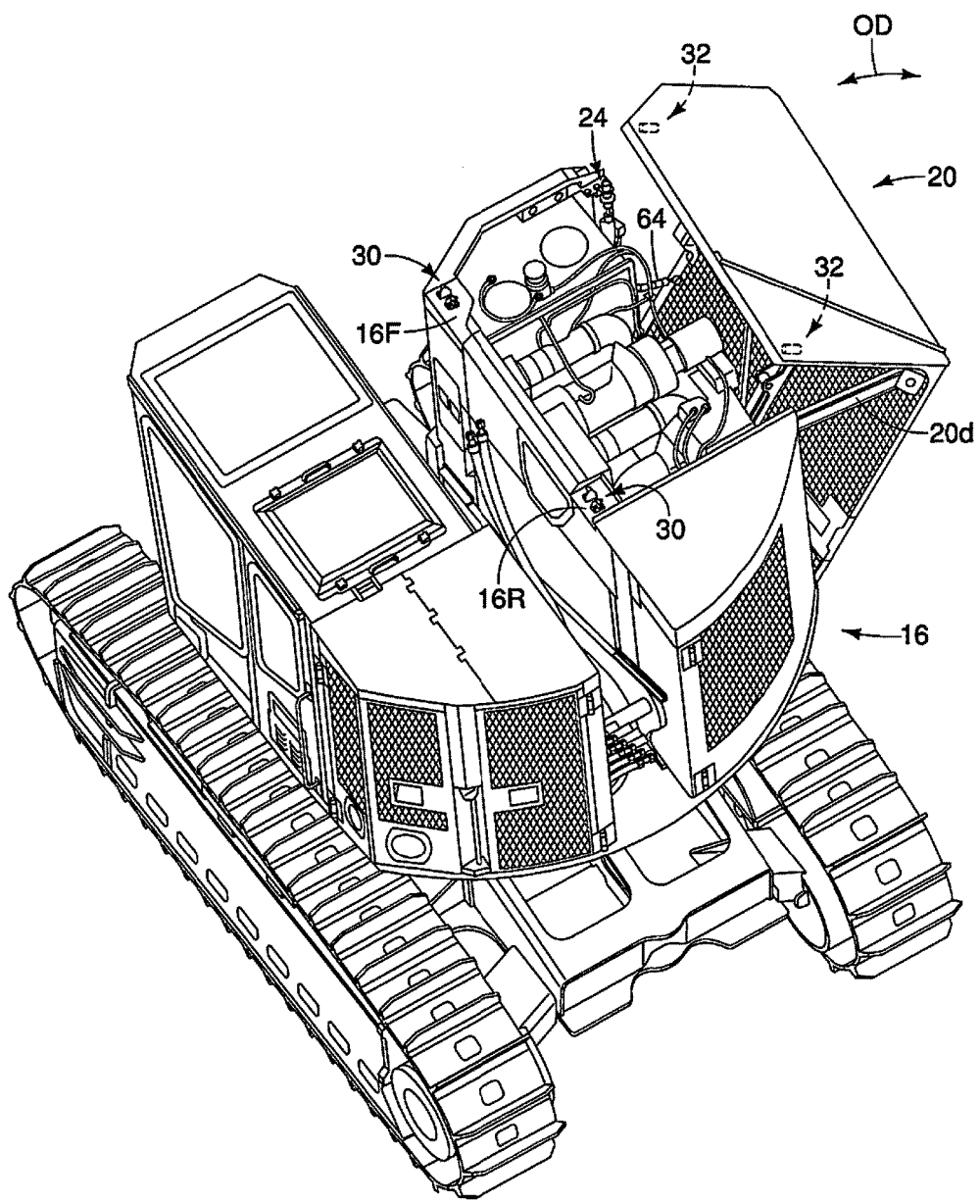
FIG. 5 is rear perspective view of the work vehicle illustrated in FIG. 1, with the work implement removed and with the vehicle cover in the partially open position (like FIG. 4)
Figure 6:
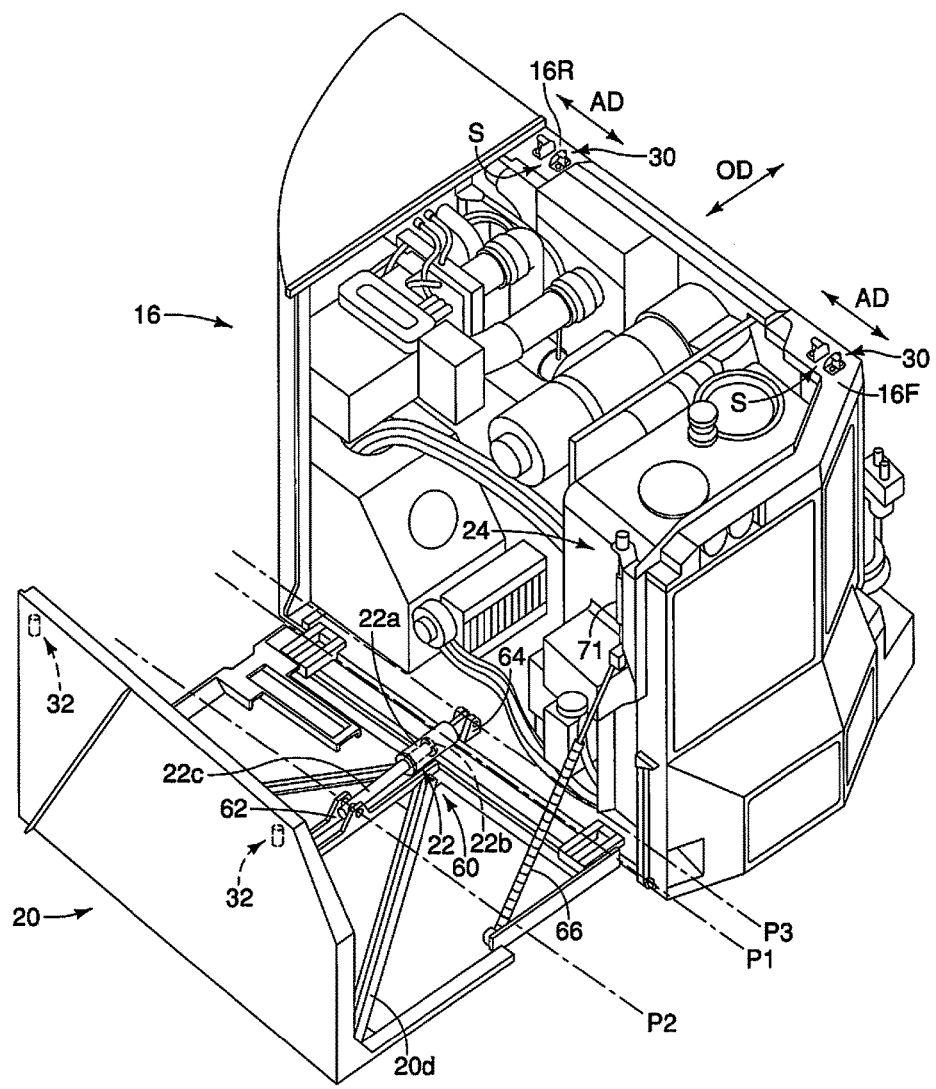
FIG. 6 is an enlarged left front side perspective view of a vehicle body of the work vehicle illustrated in FIG. 1, with the work implement removed and with the vehicle cover in a fully open position.

A selected embodiment will now be explained with reference to the drawings. It will be apparent to those skilled in the art from this disclosure that the following description of the embodiment is provided for illustration only and not for the purpose of limiting the invention as defined by the appended claims and their equivalents.

Referring initially to FIGS. 1-7, a work vehicle 10 is illustrated in accordance with one illustrated embodiment. As explained below, the work vehicle 10 is configured to improve the opening and closing of a vehicle cover 20. In the illustrated embodiment, the work vehicle 10 is a short tail tracked feller buncher. While it will be apparent to those skilled in the art from this disclosure that certain aspects may be particularly beneficial in a feller buncher, it will also be apparent that many of the aspects of the work vehicle 10 can be applied to other types of work vehicles.

In the illustrated embodiment, the work vehicle 10 is a tracked work vehicle that includes a ground propulsion apparatus 12, a chassis 14, a vehicle body 16, a work implement 18 and the vehicle cover 20. Therefore, in the illustrated embodiment, the ground propulsion apparatus 12 has a pair of tracks used to propel and maneuver the work vehicle 10 in a conventional manner. However, it will be apparent to those skilled in the work vehicle field from this disclosure that the present invention is also applicable the wheeled work vehicles in which the tracks are replaced by wheels. The vehicle body 16 is pivotally supported by and attached to the ground propulsion apparatus 12 via the chassis 14. The work implement 18 is movably attached to the vehicle body 16. The vehicle cover 20 is also movably mounted to the vehicle body 16.

In the illustrated embodiment, the work implement 18 includes a boom 18a, an arm 18b and a work attachment 18c. In the illustrated embodiment, the work attachment 18c is a feller head that has a high-speed disc saw. The boom 18a has a first portion movably attached to the vehicle body 16 and a second portion attached to the arm 18b. The arm 18b has a first portion movably attached to the boom 18a and a second portion with the work attachment 18c attached thereto. A pivotal connection attaches the boom 18a to the arm 18b in a conventional manner. While in the illustrated embodiment, the work vehicle 10 is a feller buncher in which the work implement 18 includes a boom 18a, an arm 18b, and a feller head as a work attachment 18c, it will be apparent to those skilled in the art from this disclosure that the present invention is applicable to any work vehicle having any work implement (e.g., a bucket, excavator, bulldozer blade, front end loader, etc.). It will also be apparent that the present invention is not particularly limited to a work vehicle having a work implement. In other words, the present invention is applicable to work vehicles having a vehicle cover covering at least one serviceable component.

Referring still to FIGS. 1-7, the work vehicle 10 further includes a hydraulic cylinder 22, a latch 24, a pair of guides 26, and a hydraulic circuit 28 connected to the hydraulic cylinder 22 and the latch 24, which cooperate to open and close the vehicle cover 20. In order to open the vehicle cover 20, a switch (not shown) is activated to activate the hydraulic circuit 28. Hydraulic fluid is then supplied to the latch 24 and the hydraulic cylinder 22 to open the latch 24 and open the vehicle cover 20. In order to close the vehicle cover 20, a switch (not shown) is activated to again activate the hydraulic circuit 28. Hydraulic fluid is then supplied to the hydraulic cylinder 22 to close the vehicle cover 20. When the vehicle cover 20 is closing, the pair of guides 26 will guide the vehicle cover 20 to the aligned position shown in FIGS. 1-3. Part of each guide 26 is attached to the vehicle cover 20 and part of each guide 26 is attached to the vehicle body 16. These parts of the guides 26 cooperate to guide the vehicle cover to the aligned positions shown in FIGS. 1-3. These operations will be discussed in more detail below.

Referring now to FIGS. 4-7 and 12-25 the guides 26 will now be explained in more detail. The guides 26 are identical except for their mounting locations. In the illustrated embodiment, the vehicle cover 20 is mounted to move laterally outward to the side when opened. Thus, in the illustrated embodiment, one of the guides 26 is a front guide 26 and one of the guides 26 is a rear guide 26. Since the guides 26 are identical, the same reference numerals will be used to designate identical parts. In addition, since the guides 26 are identical, only one of the guides 26 (e.g., the front guide 26 or the rear guide 26) needs to be discussed herein. However, it will be apparent to those skilled in the art from this disclosure that the descriptions and illustrations of one guide 26 also apply to the other guide 26.

Each guide 26 includes a first guide element 30 attached to the vehicle body 16 and a second guide element 32 attached to the vehicle cover 20. The first and second guide elements 30 and 32 cooperate with each other to guide the vehicle cover 20 to the aligned location shown in FIGS. 1-3 in the closed position. In particular, one of the first and second guide elements 30 and 32 includes a protrusion or male part while the other of the first and second guide elements 30 and 32 includes a recess or female part, which cooperate with each other to guide the vehicle cover 20 to the aligned location shown in FIGS. 1-3 in the closed position.

In the illustrated embodiment, one of the first and second guide elements 30 and 32 includes a roller 34 ("protrusion"), and the other of the first and second guide elements 30 and 32 includes at least one inclined guide 36. In the illustrated embodiment, the second guide element 32 includes the roller 34, and the first guide element 30 includes at least one inclined guide 36. More specifically, in the illustrated embodiment, the first guide element 30 includes a pair of the inclined guides 36, and the inclined guides 36 are spaced from each other to form a receiving space S ("recess") therebetween. When the vehicle cover 20 is closed from an open state, the roller 34 of the second guide element 32 moves along an insertion direction ID (FIG. 9) relative to the inclined guides 36 of the first guide element 30 and into the receiving space S as the vehicle cover 20 is moved to the closed position. In the illustrated embodiment, the insertion direction ID is a generally vertical direction of the work vehicle 10.

Figure 15A:
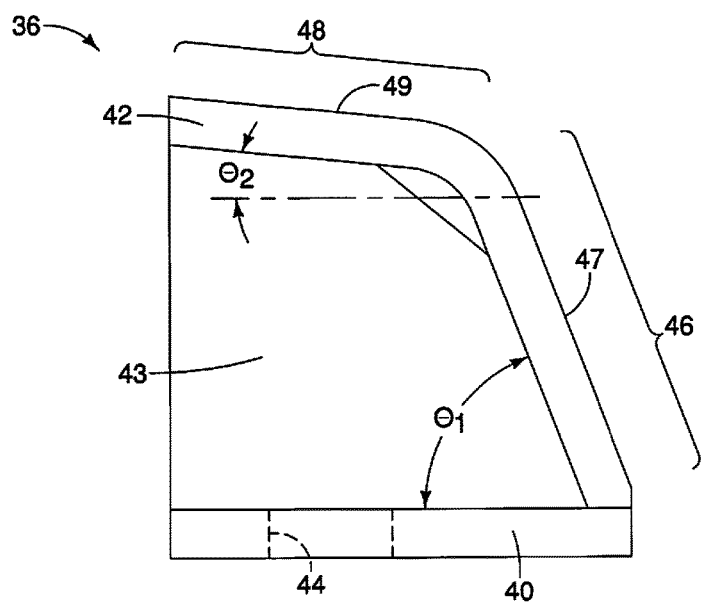
FIG. 15 (A) is a standalone side elevational view of an inclined guide as viewed in a widthwise direction of the work vehicle.
Figure 15B:
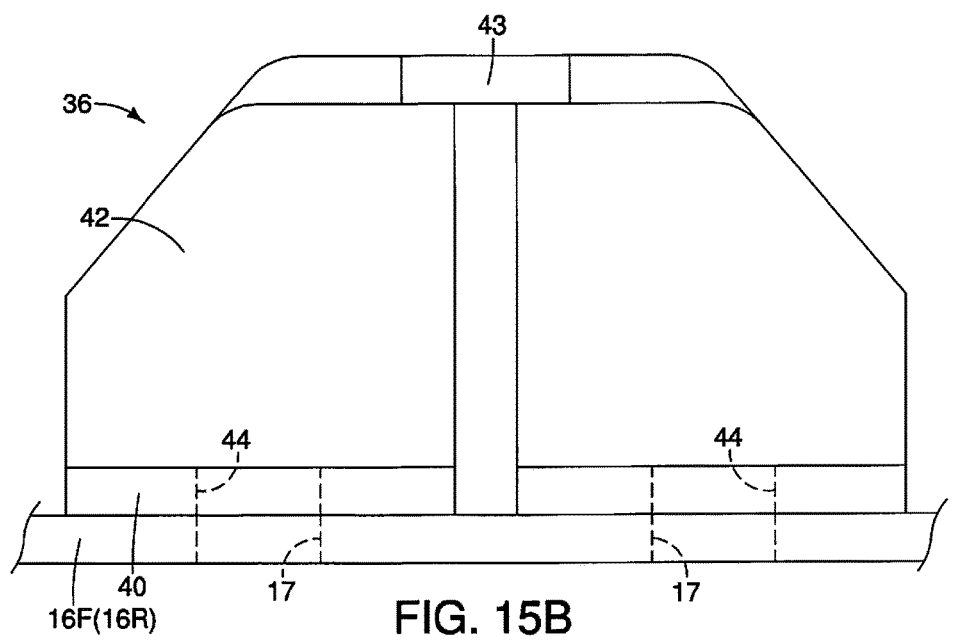

Referring now to FIGS. 15 (A) and (B), each of the inclined guides 36 includes a mounting plate 40, a guide plate 42 extending upwardly from the mounting plate 40, and a support rib 43. The mounting plate 40 has a pair of mounting holes 44 formed therein. The guide plate 42 includes a first guide section 46 extending upwardly from the mounting plate 40. In the illustrated embodiment, the guide plate 42 has a bent configuration further including and a second guide section 48 extending from the first guide section 46. The support rib 43 supports the guide plate 42 in an erect orientation with respect to the mounting plate 40 and adds rigidity to the overall structure of the inclined guide 36. In the illustrated embodiment, the mounting plate 40, the guide plate 42 and the support rib 43 are constructed as separate pieces of plate material such as metal plate that have been attached together by welding or some other suitable attachment method. However, it will be apparent to those skilled in the art that the mounting plate 40, the guide plate 42 and/or the support rib 43 can be integrally formed together as a one-piece member by casting or any suitable manufacturing technique from a rigid material such as metal. It will also be apparent to those skilled in the art from this disclosure that the mounting plate 40 and guide plate 42 can be constructed of any suitable rigid material, and/or can be constructed in other ways is needed and/or desired.

Still referring to FIGS. 15 (A) and (B), the first guide section 46 has a first inclined guide surface 47 and the second guide section 48 has a second inclined guide surface 49 with a curved, smooth transition between the first and second inclined guide surfaces 47 and 49. The first inclined guide surface 47 forms an acute angle θ1 relative to the mounting plate 40. Likewise, the second inclined guide surface 49 also forms an acute angle θ2 relative to the mounting plate 40. However, the angle θ1 between the first inclined guide surface 47 and the mounting plate 40 is larger than the angle θ2 between the second inclined guide surface 49 and the mounting plate 40. In addition, in the illustrated embodiment, the angle 81 between the first inclined guide surface 47 and the mounting plate 40 is larger than 45 degrees. On the other hand, the angle θ2 between the second inclined guide surface 49 and the mounting plate 40 is less than 45 degrees. The angle θ1 between the first inclined guide surface 47 and the mounting plate 40 is preferably between 60 degrees and 80 degrees, e.g., 70 degrees. On the other hand, the angle 82 between the second inclined guide surface 49 and the mounting plate 40 is preferably closer to 0 degrees than 45 degrees, e.g., less than 22.5 degrees. In the illustrated embodiment, the angle between the second inclined guide surface 49 and the mounting plate 40 is about 10 degrees.

Referring now to FIGS. 4-7 and 12-25, each mounting plate 40 is fixedly attached to the vehicle body 16. More specifically, the vehicle body 16 includes front and rear body plates 16F and 16R to which the mounting plates 40 are fixedly attached. Each of the front and rear body plates 16F and 16R includes two pairs of mounting slots 17. Bolts 50 extend through the mounting holes 44 and the mounting slots 17 to attach the mounting plates 40 to the front and rear body plates 16F and 16R. In the illustrated embodiment, the bolts 50 extend upward through the mounting slots 17 and the mounting holes 44 and are secured with nuts 51. Alternatively, the mounting holes 44 may be threaded so that the bolts 50 are directly threaded thereto so the nuts 51 are unnecessary (not shown).

The mounting slots 17 extend in a direction transverse to an opening direction OD of the vehicle cover 20. Thus, the mounting position of each of the inclined guides 36 can be independently adjusted along an adjustment direction AD transverse to the opening direction OD by loosening the bolts 50, as best understood from FIGS. 15-25 showing numerous mounting locations of the inclined guides 36. The adjustment direction AD is transverse to both the opening direction OD of the vehicle cover 20 and the insertion direction ID of the rollers 34. Thus, the adjustment direction AD is also transverse to a longitudinal center of each of the rollers 34. In the illustrated embodiment, the insertion direction ID corresponds to a generally vertical direction of the vehicle body 16, the opening direction OD of the vehicle cover 20 corresponds to a widthwise direction of the vehicle body 16, and the adjustment direction AD corresponds to a lengthwise (longitudinal) direction of the vehicle body 16. However, it will be understood that the insertion direction ID, the opening direction OD, and adjustment AD of the present invention are not limited to these particular orientations with respect to the vertical, widthwise, and lengthwise directions of the vehicle body 16. Also, although the positions of the inclined guides 36 are adjustable when the bolts 50 are not tightened, the inclined guides 36 are non-movable relative to the front and rear body plates 16F and 16R when the bolts 50 are tightened. Adjustment will be discussed later after discussion of the rollers 34 and the vehicle cover 20.

Referring again to FIGS. 4-7 and 12-25, the rollers 34 will now be explained in more detail. In the illustrated embodiment, each roller 34 has a cylindrical shape and includes an outer contact portion 34a and an inner support portion 34b. The outer contact portion 34a is arranged and configured to enter the receiving space S and contact the inclined guides 36 when the vehicle cover 20 is closed. The inner support portion 34b is disposed at least partially inside the outer contact portion 34a and configured to rotatably support the outer contact portion 34a with respect to the vehicle cover 20. The outer contact portion 34a is preferably constructed of an at least partially elastic material. In the illustrated embodiment, the contact portion 34a of each roller 34 is constructed of a solid urethane material. The inner support portion 34b basically includes an elongated pin portion 52 and a head 54 having a slightly larger diameter than the pin portion 52. The head 54 is fixed at one end of the pin portion 52.

Figure 7A:
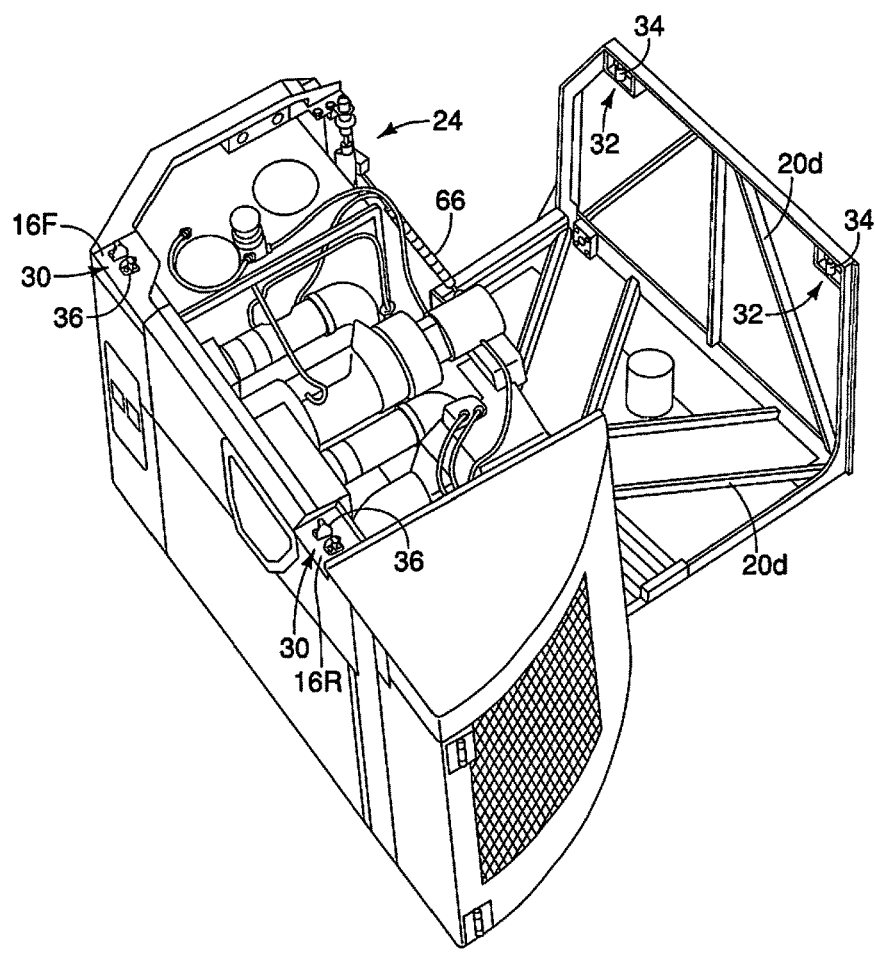
FIG. 7 (A) is an enlarged rear perspective view of the vehicle body illustrated in FIG. 1, with the work implement removed and with the vehicle cover in the fully open position (like FIG. 6)
Figure 7B:
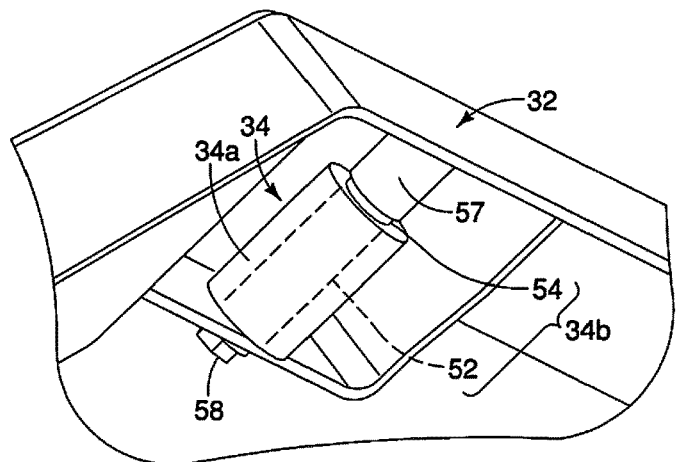

The outer contact portion 34a is fitted onto the pin portion 52 such that the outer contact portion 34a abuts against the head 54. An internal diameter of the outer contact portion 34a may be slightly smaller than an external diameter of the pin portion 52 to allow the outer contact portion 34a to fit snugly against the external surface of the pin portion 52. Alternatively, the internal diameter of the outer contact portion 54 may be slightly larger than the external diameter of the pin portion 52 such that the outer contact portion 34a can rotate about the pin portion 52. Thus, the outer contact portion 34a may be rotatable with respect to the inner support portion 34b, or the outer contact portion 34a and the inner support portion 34b may be rotatable together with respect to a support structure provided inside the vehicle cover 20. As best shown in FIGS. 7 and 16-21, in the illustrated embodiment, the pin portion 52 and the head 54 are provided with a longitudinal hole 56 such that a bolt 58 can be passed therethrough. As shown in FIG. 7, in the illustrated embodiment, the roller 34 is disposed between two flanges on an underside of the vehicle cover 20 and the bolt 58 is passed through a hole in one of the flanges and screw tightened into a mounting portion 57 having a threaded hole (not shown) provided on the other of the flanges to secure the roller 34 to the vehicle cover 20. A washer (not shown) may be arranged on the pin portion 52 between the one of the flanges and the outer contact portion 34a (at the opposite end of the pin portion 52 from the head 54), or on the bolt 58 between the flange and the pin portion 52, to facilitate rolling of the roller 34 about the bolt 58. A person of ordinary skill in the work vehicle field will recognize that the structure for mounting the rollers 34 to the vehicle cover 20 is not limited to the structure illustrated in the drawings. Any mounting structure is acceptable so long as the rollers 34 can be securely attached to the vehicle cover 20, preferably such that the rollers 34 can rotate freely.

Referring now to FIGS. 2-9, the vehicle cover 20 will now be explained. The vehicle cover 20 has the general shape of a flat planar member that has been bent into an L-shape. The vehicle cover 20 serves to cover a compartment in which serviceable components are housed inside the vehicle body 16. Examples of serviceable components include such components as an engine, an engine oil gauge, an engine oil filter, a hydraulic oil filter, a fuel filter, and an air filter. Other serviceable components may include electrical wiring, hoses, and any other components that are normally enclosed in a compartment (e.g., an engine compartment) and may require regular or periodic maintenance.

The vehicle cover 20 basically includes a side panel 20a and a top panel 20b with a corner portion 20c disposed between the side panel 20a and the top panel 20b. The side panel 20a and the top panel 20b may be formed out of a single sheet of material or provided as separate pieces that are attached together by welding or some other attachment method in the vicinity of the corner portion 20c. In the illustrated embodiment, ribs 20d are provided on an inner surface of the side panel 20a and the top panel 20b to provide rigidity and support the shape of the vehicle cover 20.

The vehicle cover 20 is pivotally mounted to the vehicle body 16 to pivot about a first pivot axis P1 between the closed position and the open position. The first pivot axis P1 is preferably parallel to the adjustment direction AD of the inclined guides 36. In the illustrated embodiment, the first pivot axis P1 extends in the longitudinal direction of the vehicle body 16 and is disposed on a lower left side of the vehicle body 16 in a frontal view of the vehicle body 16 (e.g., see FIG. 6). Thus, when the vehicle cover 20 is opened from the closed position, the top panel 20b initially moves laterally outward (leftward) in the opening direction OD. As the vehicle cover 20 approaches a fully opened state, the movement direction of the top panel 20b approaches a downward direction. Meanwhile, the inside edge (rightward edge) of the top panel 20b initially moves upward and leftward as the vehicle cover 20 pivots such that the rollers 34 lift away from the inclined guides 36. When the vehicle cover 20 is in the closed position, the edges of the vehicle cover 20 are flush with other portions of the vehicle body 16. This is considered an aligned position. The alignment of the vehicle cover 20 with respect to the vehicle body 16 when the vehicle cover 20 is in the closed position can be fine adjusted by adjusting the positions of the inclined guides 36, as explained later, so the vehicle cover is not misaligned when in the closed position, (i.e., so the vehicle cover is in the aligned position when in the closed position.

Referring now to FIGS. 4-11, an opening and closing structure 60 is used to move the vehicle cover 20 between the open position and the closed position. The opening and closing structure 60 basically includes the hydraulic cylinder 22, the hydraulic circuit 28, a first attachment bracket 62 fixed to an inside face of the side panel 20a of the vehicle cover 20, and a second attachment bracket 64 fixed to the vehicle body 16. As previously mentioned, the hydraulic cylinder 22 serves to move the vehicle cover 20 between the closed position and the open position. The hydraulic cylinder 22 basically includes a cylinder member 22a, a piston member 22b, and a push rod 22c. The piston member 22b is received in a hydraulic cylinder chamber defined by the cylinder member 22a. The push rod 22c extends outward from the cylinder member 22a in a longitudinal direction of the hydraulic cylinder 22. The push rod 22c has a first end attached to the piston member 22b and a second end pivotally attached to the first attachment bracket 62 such that the second end of the push rod 22c can pivot about a second pivot axis P2 with respect to the vehicle cover 20. Meanwhile, a base end of the cylinder member 22a (i.e., the end opposite the push rod 22c) is pivotally attached to the second attachment bracket 64 provided on the vehicle body 16 such that the cylinder member 22a can pivot about a third pivot axis P3 with respect to the vehicle body 16. A support cable 66 has one end attached to the vehicle body 16 and the other end attached to the vehicle cover 20. The support cable 66 supports the vehicle cover 20 when the vehicle cover 20 is in the open position.

Figure 11:
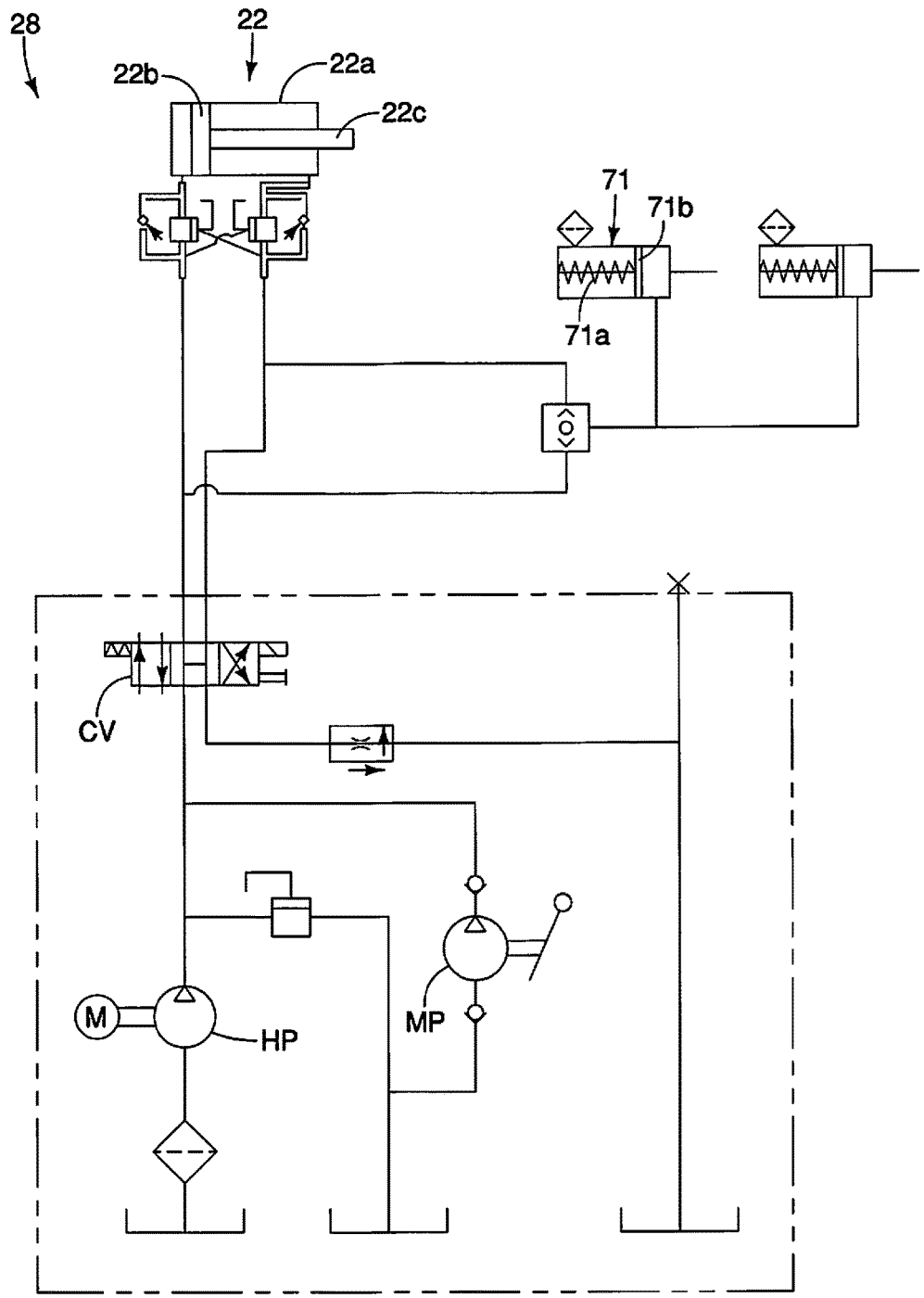
FIG. 11 is a circuit diagram of the hydraulic circuit that opens/closes the latch and opens/closes the vehicle cover.
Figure 12:
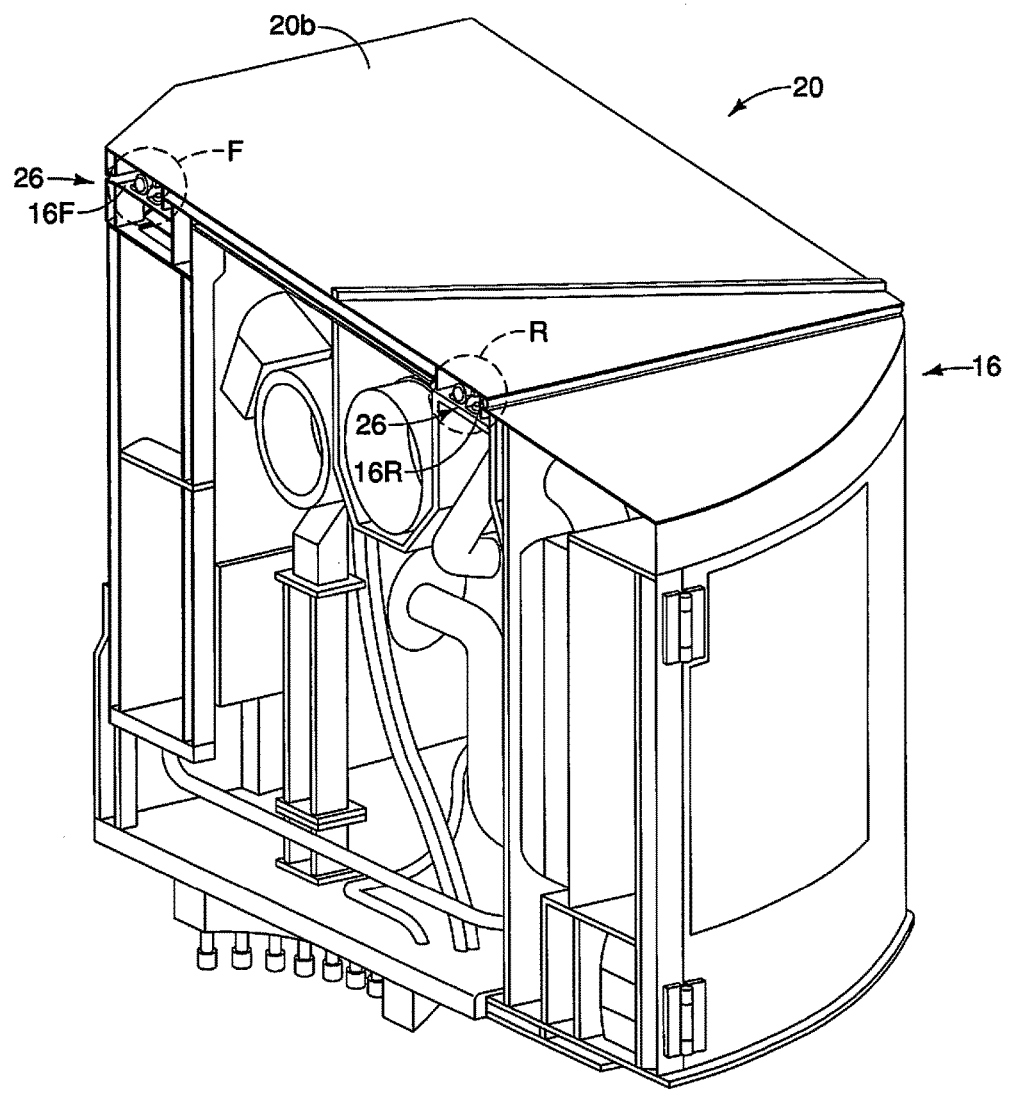
FIG. 12 is an inside sectional view of a portion of the vehicle body of the work vehicle illustrated in FIGS. 1-9 (i.e., a right side view of FIG. 8) with the vehicle cover closed in order to illustrate a pair of guides.
Figure 13:
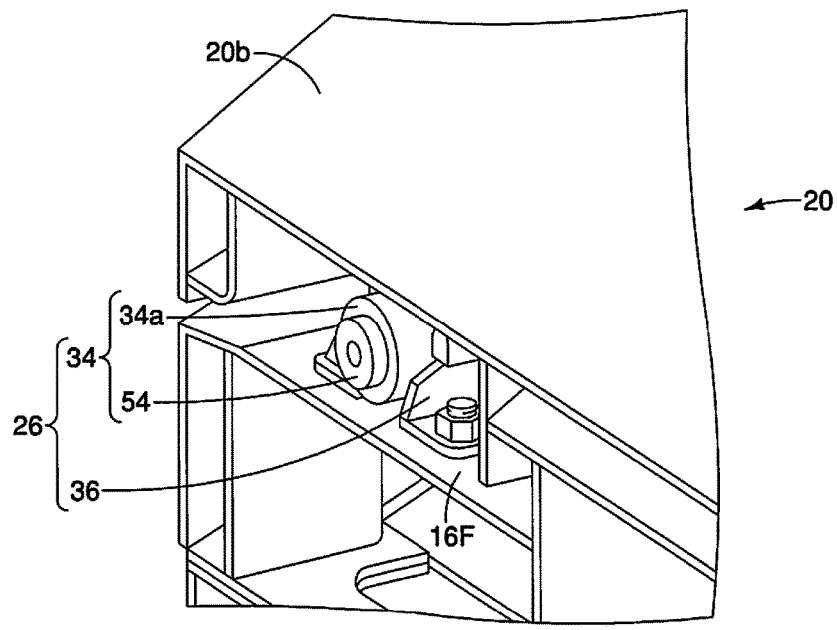
FIG. 13 is an enlarged view of the circled area F of FIG. 12 showing the front guide.
Figure 14:
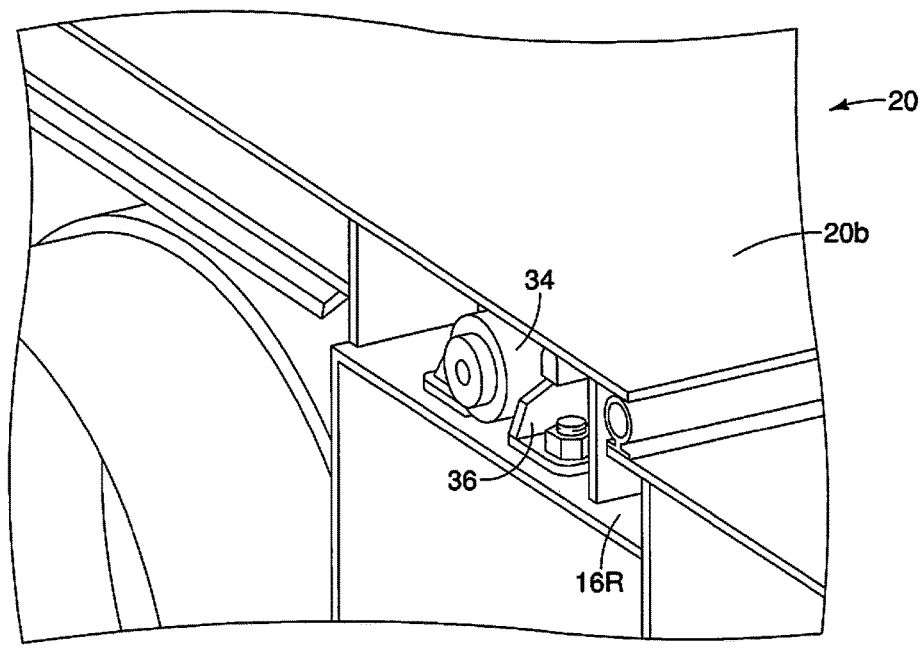
FIG. 14 is an enlarged view of the circled area R of FIG. 12 showing the rear guide.

Referring to FIG. 11, the cylinder member 22a is fluidly coupled to a hydraulic pump HP of the hydraulic circuit 28 so that the piston member 22b and the push rod 22c move longitudinally back and forth relative to the cylinder member 22a in response to activation of the hydraulic pump HP in a conventional manner. When the hydraulic pressure causes the push rod 22c to extend outward from the cylinder member 22a while the latch 24 (explained later) is disengaged, the second end of the push rod 22c pushes against the vehicle cover 20 with an opening force and causes the vehicle cover 20 to pivot in the opening direction OD such that the rollers 34 separate from the inclined guides 36 and the vehicle cover 20 as a whole separates from the vehicle body 16. In the illustrated embodiment, when the vehicle cover 20 reaches a fully opened state (open position), the support cable 66 becomes taut to support the weight of the vehicle cover 20.

Conversely, when the vehicle cover 20 is open and hydraulic fluid is supplied to the hydraulic cylinder 22 in an opposite direction, the hydraulic cylinder 22 retracts the push rod 22c and exerts a closing force on the vehicle cover 20 to pull the vehicle cover 20 to the closed position. The flow of hydraulic fluid to the hydraulic cylinder 22 may be controlled by a controller (not shown) and/or a mechanical structure (not shown) to appropriately vary the force exerted on the vehicle cover 20 by the hydraulic cylinder 22 during the process of opening or closing the vehicle cover 20 such that the movement of the vehicle cover 20 is smooth and maintained at a reasonable speed. Although the opening and closing structure 60 of the illustrated embodiment uses a hydraulic cylinder 22 connected between first and second attachment brackets 60 and 62 to open and close the vehicle cover 20, it will be recognized by those of ordinary skill in the art that other structures may be used to open and close the vehicle cover 20. For example, an electric motor connected to a pulley system or a system of gears may be used to open and close the vehicle cover 20.

Referring now to FIGS. 12-25, the adjustable feature(s) of the guides 26 using the inclined guides 36 will be explained in more detail. As previously mentioned, in the illustrated embodiment, each of the inclined guides 36 is provided with a pair of mounting holes 44 configured to allow bolts 50 to pass through the mounting plate 40. Meanwhile, the vehicle body 16 is provided with front and rear body plates 16F and 16R in which the mounting slots 17 have been formed. Each of the inclined guides 36 is mounted to an upper surface of one of the front and rear body plates 16F and 16R by passing the pair of bolts 50 through the pair of mounting holes 44 and the pair of mounting slots 17. A nut 51 is attached to one end of each of the bolts 50 to enable the bolts 50 to be tightened and loosened with respect to the mounting plate 40 and the front or rear body plate 16F or 16R. Thus, the position of each of the inclined guides 36 can be adjusted by loosening the bolt 50 and sliding the mounting plate 40 with respect to the front or rear body plate 16F or 16R along the direction in which the mounting slots 17 extend.

The direction in which the mounting slots 17 extend corresponds to the adjustment direction AD of the inclined guides 36 mentioned previously. In the illustrated embodiment, the mounting slots 17 are arranged to extend in the longitudinal direction of the vehicle body 16 parallel to the first pivot axis P1 of the vehicle cover 20. Although the illustrated embodiment presents one structure for adjustably mounting the inclined guides 36 with respect to the vehicle body 16, it will be apparent to persons of ordinary skill in the work vehicle field that other structures may be used. For example, the inclined guides 36 can be slidably mounted on rails (not shown) that are fixed to the front or rear body plate 16F or 16R and extend in the adjustment direction AD, and the positions of the inclined guides 36 can be fixed with respect to the rails using a set screw or other fastening structure. Also, in the illustrated embodiment, both of the pair of inclined guides 36 mounted on front body plate 16F are adjustable, and both of the pair of included guides 36 mounted on the rear body plate 16R are adjustable along the adjustment direction AD. However, it is acceptable for only one of each pair of the inclined guides to be adjustable along the adjustment direction AD, if a lesser degree of adjustability is needed and/or desired.

Figure 16:
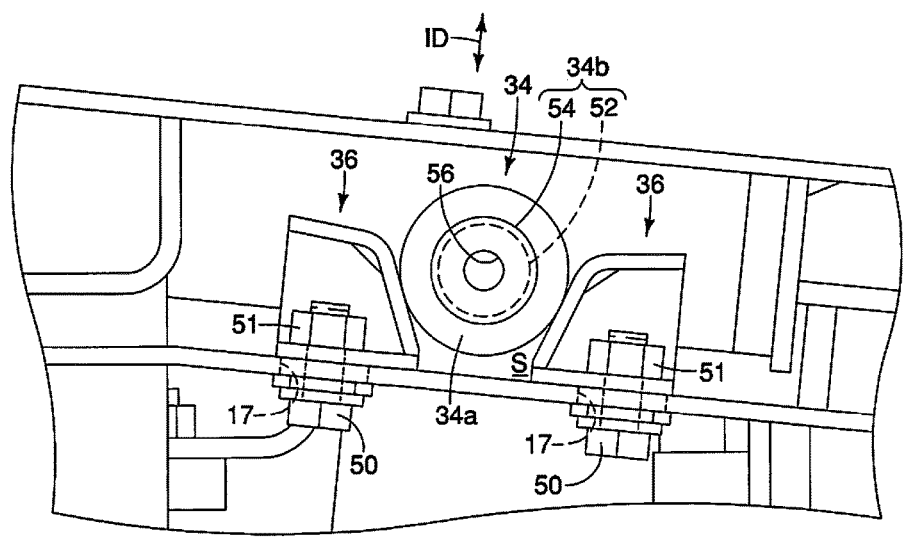
FIG. 16 is a further enlarged elevational view of the front guide illustrated in FIG. 13, with the front guide in one aligned position.
Figure 17:
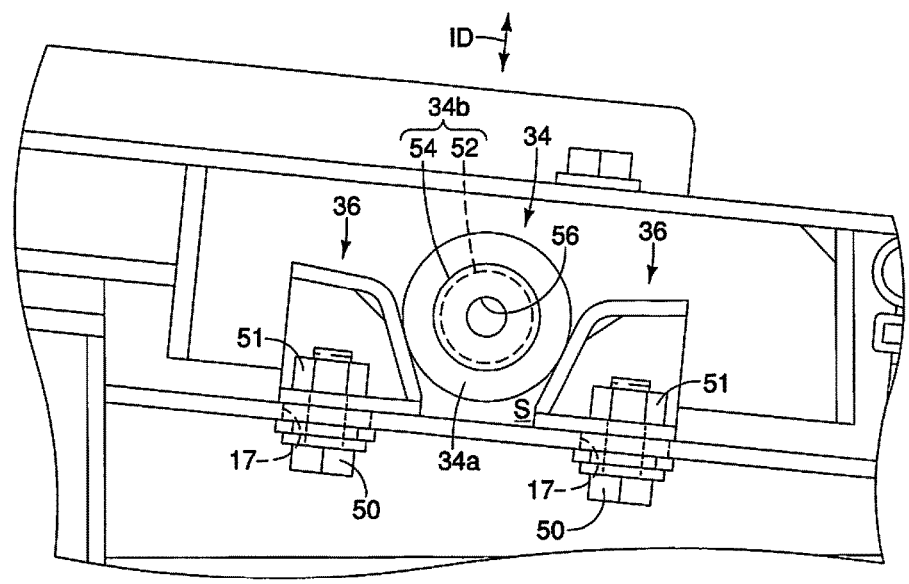
FIG. 17 is a further enlarged elevational view of the rear guide illustrated in FIG. 14, with the rear guide in one aligned position.
Figure 18:
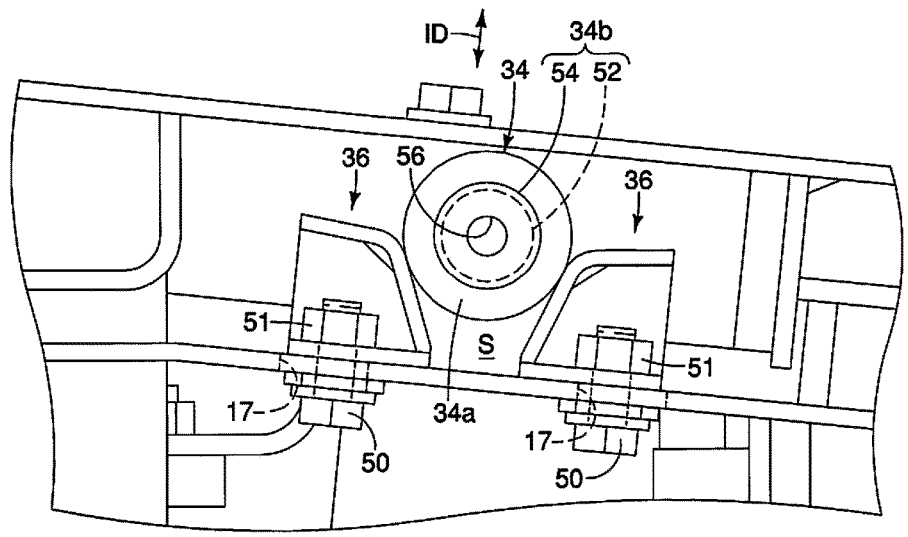
FIG. 18 is a further enlarged elevational view of the front guide illustrated in FIG. 13, with the front guide in another, higher, aligned position.
Figure 19:
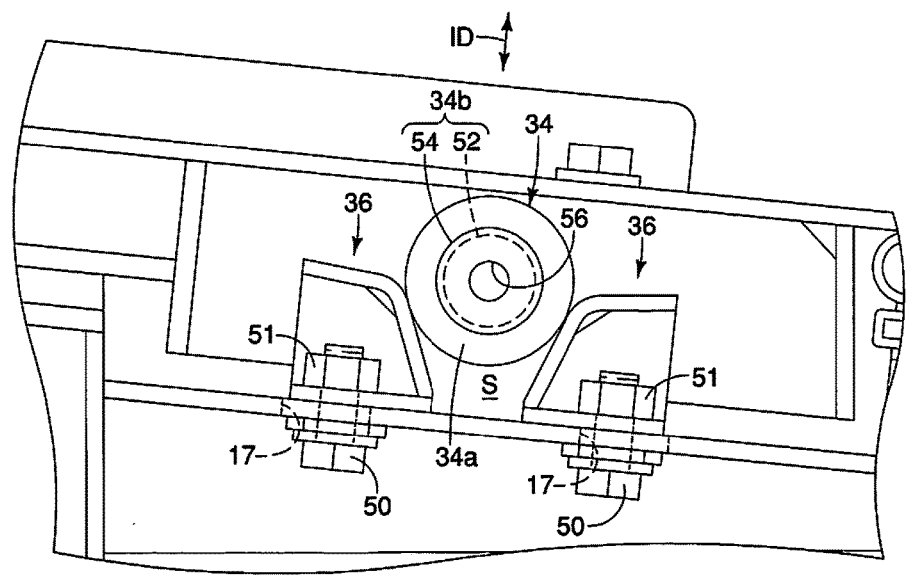
FIG. 19 is a further enlarged elevational view of the rear guide illustrated in FIG. 14, with the rear guide in another, higher, aligned position.
Figure 20:
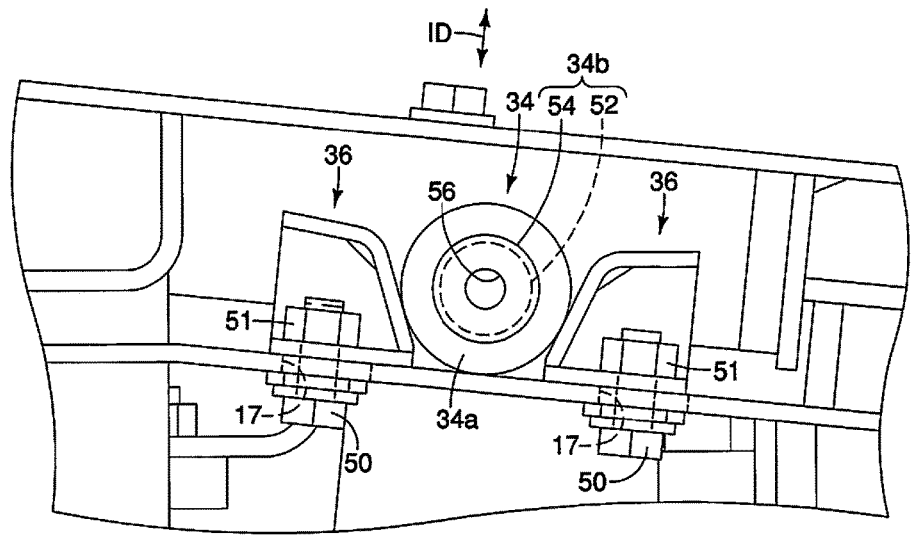
FIG. 20 is a further enlarged elevational view of the front guide illustrated in FIG. 13, with the front guide in another, lower, aligned position.
Figure 21:
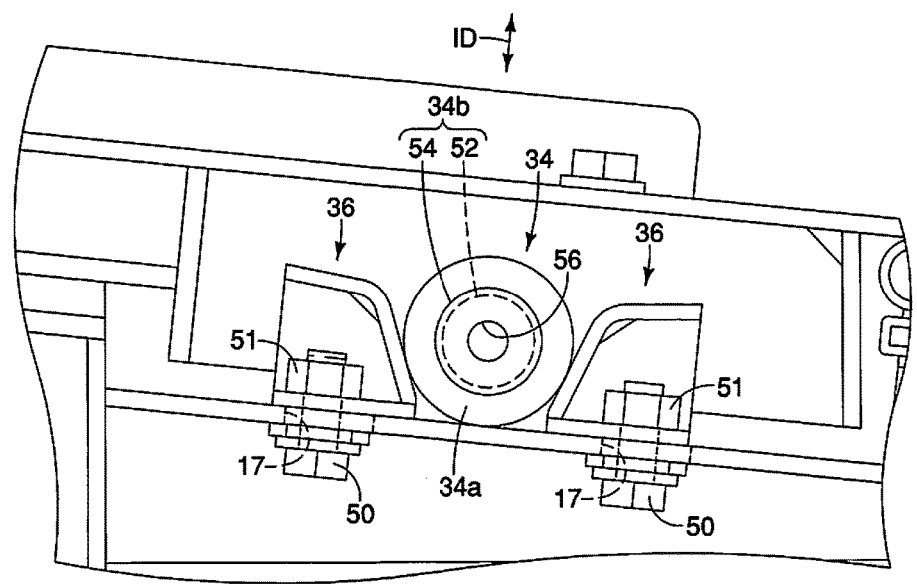
FIG. 21 is a further enlarged elevational view of the rear guide illustrated in FIG. 14, with the rear guide in another, lower, aligned position.

As explained previously, each pair of the inclined guides 36 are arranged spaced apart from each other to form a receiving space S. A width of the receiving space S can be adjusted by adjusting the position(s) of one or both of the inclined guides 36 in adjustment direction AD. In this way, a position of the roller 34 when the vehicle cover 20 is in the closed position can be adjusted in the insertion direction ID. Various positions are illustrated in FIGS. 16-25. In FIGS. 16-17, first positions of the inclined guides 36 are shown. However, if the inclined guides 36 are adjusted to be closer together, then the receiving space S narrows because the first inclined guide surfaces 47 are moved closer together. As a result, the rollers 34 contact a higher portion of the first inclined surfaces 47 and, thus, enter less deeply into the receiving space S, as shown in FIGS. 18-19. Conversely, if the inclined guides 36 are moved farther apart, then the receiving space S widens because the first inclined guide surfaces 47 are moved farther apart. As a result, the roller 34 can enter deeper into the receiving space S before the roller 34 contacts the first inclined guide surfaces 47 and the vehicle cover 20 reaches a lower aligned location, as shown in FIG. 20-21. Thus, by adjusting at least one of the first inclined surfaces 47 along the adjustment direction AD, which is perpendicular to the insertion direction ID as mentioned previously, the first inclined surfaces 47 become closer together or farther apart and a position of the roller 34 relative to the first inclined surfaces 47 along the insertion direction ID (i.e., a height of the roller 34) when the vehicle cover 20 is in the closed position is adjusted so the vehicle cover 20 can be properly aligned. That is, depending on which portions of the pair of first inclined surfaces 47 are contacted by the roller 34 when the vehicle cover 20 is in the closed position, a position of the vehicle cover 20 with respect to the vehicle body 16 changes in the insertion direction ID.

Figure 22:
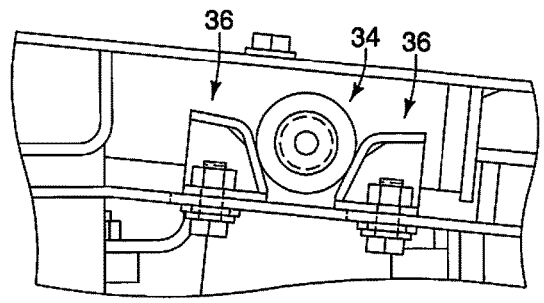
FIG. 22 is an elevational view of the front guide illustrated in FIG. 13, with the front guide in another, rearward, aligned position.
Figure 23:
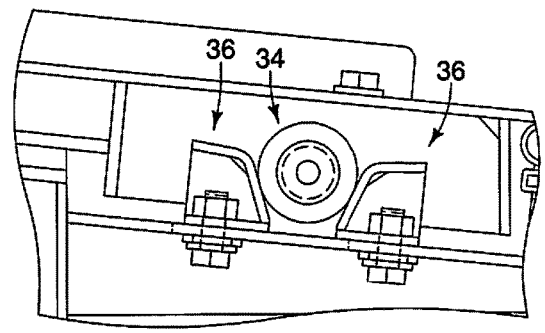
FIG. 23 is a further enlarged elevational view of the rear guide illustrated in FIG. 14, with the rear guide in another, rearward, aligned position.
Figure 24:
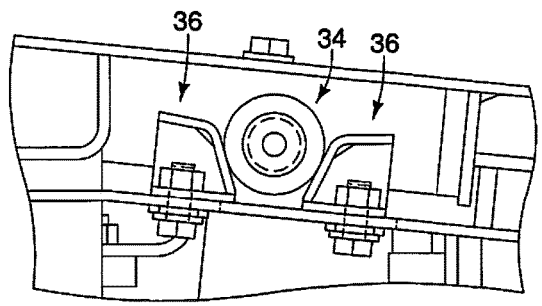
FIG. 24 is an elevational view of the front guide illustrated in FIG. 13, with the front guide in another, forward, aligned position.
Figure 25:
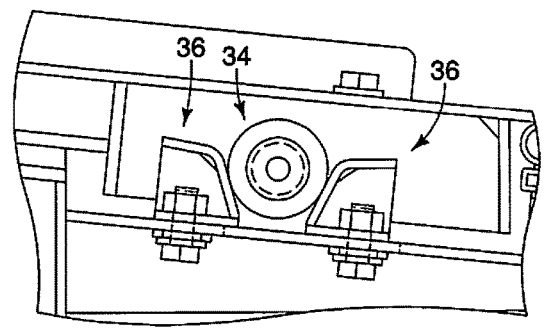
FIG. 25 is an elevational view of the rear guide illustrated in FIG. 14, with the rear guide in another, forward, aligned position.

Moreover, when both of the inclined guides 36 of each pair are adjustable, the position where the rollers 36 rest when the vehicle cover 20 is in the aligned position (closed position) can be adjusted in the adjustment direction AD. For example, by moving both of the inclined guides 36 in the same direction along the adjustment direction AD while keeping the width of the receiving space S unchanged, the position where the corresponding roller 36 rests when the vehicle cover 20 is in the aligned position can be adjusted along the adjustment direction AD without changing the position in the insertion direction ID. FIGS. 22-23 illustrate rearward adjustment. FIGS. 24-25 illustrate forward adjustment. In other words, by making both of the inclined guides 36 of each pair adjustable, the aligned position of the vehicle cover 20 can be adjusted with a greater degree of freedom because it is possible to adjust the positions of the rollers 36 with respect to the vehicle body 16 in both the insertion direction ID and the adjustment direction AD independently, even though the inclined guides 36 are adjustable along a single plane parallel to the adjustment direction AD. In the illustrated embodiment, since all four of the inclined guides 36 can be adjusted in the adjustment direction AD, the aligned position of the vehicle cover 20 can be adjusted in the fore and aft (longitudinal direction) of the vehicle body 16 and in the vertical (height) direction of the vehicle body 16 (particularly the position of a widthwise inside edge of the top panel 20b can be adjusted) by adjusting the positions of the inclined guides 36. In this way, the alignment of the vehicle cover 20 with respect to the vehicle body 16 can be finely adjusted such that the vehicle cover 20 is flush with the vehicle body 16 at portions where the edges of the vehicle cover 20 meet the edges of the vehicle body 16.

Although the illustrated embodiment discloses two first guide elements 30 and two second guide elements 32, i.e., front and rear pairs of inclined guides 36 and front and rear rollers 34, it is possible to have only one first guide element and only one second guide element. For example, in a case in which the vehicle cover can be sufficiently supported by only a single guide (e.g., when the vehicle cover is comparatively small and lightweight), a similar effect can be obtained by providing only one first guide element and only one second guide element. For example, if a smaller vehicle cover is arranged to open and close in a widthwise direction of a work vehicle similarly to the vehicle cover 20 of the work vehicle 10 in the illustrated embodiment, then a single roller 34 can be provided in a fore-aft center portion of the vehicle cover instead of front and rear ends as in the illustrated embodiment. Similarly, a single pair of inclined guides 36 can be provided on the vehicle body in a position corresponding to the position of the single roller 34 when the smaller vehicle cover is in a closed position. With such a configuration, the height and fore-aft position of a top panel of the smaller vehicle cover can be adjusted by adjusting the positions of the pair of inclined guides 36 along the adjustment direction AD. Although this alternative example describes a situation in which the vehicle cover is "smaller," a person of ordinary skill in the work vehicle field will realize that a configuration using only a single first guide element and a single second guide element is not necessarily limited to a small vehicle cover.

Additionally, although the illustrated embodiment illustrates a configuration in which both of the inclined guides 36 of each of the first guide elements 30 are adjustable, it is possible for only one of the inclined guides 36 to be adjustable while the other inclined guide 36 is fixed. With such an arrangement, it is still possible to adjust the position of the vehicle cover 20 in both the insertion direction ID and the adjusting direction AD, although not independently. Such an arrangement might be used, for example, in a situation where structural or spatial limitations make it difficult to attach both of the inclined guides 36 of each of the first guide elements 30 in an adjustable manner. Also, although in the illustrated embodiment both of the inclined guides 36 of each of the first guide elements 30 have the first inclined surface 47, it is possible to configure the first guide element 30 to have only one inclined surface. For example, the first guide element 30 can include one guide part that has an inclined surface and another that has a vertical surface. In other words, so long the first guide element 30 has at least one inclined surface, the position of the vehicle cover 20 in the insertion direction ID can be adjusted by adjusting the position of the inclined surface in the adjustment direction AD.

Referring now to FIGS. 8-11, the latch 24 will now be explained. The latch 24 is provided to releasably hold the vehicle cover 20 in the closed position. The latch 24 includes a first latch element 70 and a second latch element 72. In the illustrated embodiment, the first latch element 70 is attached to the vehicle body 16 and the second latch element 72 is attached to the vehicle cover 20. The first latch element 70 and the second latch element 72 cooperate with each other to releasably hold the vehicle cover 20 in the closed position. In the illustrated embodiment, the second latch element 72 includes a latch plate 74 having an opening 74a passing through the latch plate 74 in a thickness direction of the latch plate 74. The latch plate 74 is fixed to an inside surface of the vehicle cover 20 at a corner portion of the vehicle cover 20. More specifically, the latch plate 74 is fixed to an inside portion of the vehicle cover 20 so as to be disposed underneath a forward, outside corner portion of the top panel 20b when the vehicle cover 20 is in the closed position. Thus, the latch plate 74 is under a left-hand, front corner portion of the top panel 20b when the vehicle cover 20 is in the closed position and viewed in a rearward direction from in front of the work vehicle 10. In the illustrated embodiment, the latch plate 74 is arranged to be parallel to the top panel 20b of the vehicle cover 20.

The first latch element 70 includes a movable element 76 configured to extend toward (and through) and retract away from the latch plate 74. More specifically, the movable element 76 can be moved between a latched position (FIG. 8) and a release position (FIG. 9). In the illustrated embodiment, the movable element 76 has a generally cylindrical external shape, but the external shape of the movable element 76 is not limited to a cylindrical shape or to the particular shape shown in the drawings. The movable element 76 has a retaining end 76a. The retaining end 76a is received in the opening 74a when the movable element 76 is in a latched position, and the retaining end 76a is moved out of the opening 74a when the movable element 76 is in the release position. Thus, by engaging the movable element 76 with the opening 74a of the latch plate 74 when the vehicle cover 20 is in the closed position, the vehicle cover 20 can be secured in the closed position even if a closing force is not exerted against the vehicle cover 20 by the hydraulic cylinder 22. Conversely, by retracting the movable element 76 such that the retaining end 76a moves out of the opening 74a, the vehicle cover 20 can be opened by actuating the hydraulic cylinder 20 to exert an opening force against the vehicle cover 20. In this way, the latch 24 releasably holds the vehicle cover 20 in the closed position.

Referring still to FIGS. 8-11, in the illustrated embodiment, the movable element 76 is configured to move along a latch axis LA that passes through the opening 74a when the vehicle cover 20 is in the closed position. Thus, the movable element 76 can be moved along the latch axis LA such that the retaining end 76a is extended into the opening 74a or retracted out of the opening 74a. More specifically, the movable element 76 is arranged such that it is aligned with the opening 74a, i.e., such that the latch axis LA passes through the opening 74a, when the vehicle cover 20 is in the closed position. In the illustrated embodiment, the first latch element 70 is disposed directly below the second latch element 72 when the vehicle cover 20 is in the closed position such that the movable element 76 is positioned underneath the opening 74a and the latch axis LA extends in a vertical direction of the work vehicle 10. However, the latch 24 is not limited to a vertical arrangement of the opening 74a and the movable element 76. For example, a horizontal arrangement of the opening 74a and the movable element 76 is also acceptable so long as the vehicle cover 20 can be secured in the closed position when the retaining end 76a of the movable element 76 is extended through the opening 74a. In the illustrated embodiment the first latch element 70 attached to the vehicle body 16 includes the movable element 76 and the second latch element 72 includes the latch plate 74 with the opening 74a. The structures of the first latch element 70 and the second latch element 72 can be interchanged. That is, the first latch element 70 attached to the vehicle body 16 can include the latch plate 74 and the opening 74a, and the second latch element 72 attached to the vehicle cover 20 can include the movable element 76. It is also acceptable to use a latch having a different structure so long as the latch is capable of holding the vehicle cover 20 in the closed position.

Also, in the illustrated embodiment, the first latch element 70 includes a single-acting cylinder 71 that drives the movable element 76 along the latch axis LA. More specifically, the single-acting latch cylinder 71 is biased upward toward the opening 74a by a spring 71a. When hydraulic fluid is supplied to the single-acting cylinder 71, a piston 71b of the latch cylinder 71 moves downward against the biasing action of the spring 71a. In this way, the movable element 76 can be normally biased upward to keep the vehicle cover 20 closed without actuating the hydraulic circuit 28. However, it is also acceptable for the movable element 76 to be driven along the latch axis LA by, for example, a solenoid or an electric motor coupled to a system of gears instead of a hydraulic cylinder.

Referring now to FIGS. 4-11, operation of the opening and closing structure 60 and the latch 24 will now be explained in more detail. In the illustrated embodiment, the opening and closing structure 60 and the latch 24 are operatively coupled to each other such that the latch 24 releases the vehicle cover 20 when the opening and closing structure 60 moves from the closed position to the open position. More particularly, the hydraulic cylinder 22 of the opening and closing structure 60 and the latch cylinder 71 of the first latch element 70 are driven by hydraulic fluid from the same hydraulic circuit 28 as shown in FIG. 11. The hydraulic circuit 28 is configured such that when the switch (not shown) is operated to open the vehicle cover 20, the hydraulic pump HP runs and hydraulic fluid is supplied to the hydraulic cylinder 22 such that the hydraulic cylinder 22 exerts an opening force against the vehicle cover 20 and hydraulic fluid is simultaneously supplied to the latch cylinder 71 to move the movable element 76 downward against the biasing force of the spring 71a. In the illustrated embodiment, the piston 71b of the latch cylinder 71 operates (moves) when a force that is approximately 25% the force required to move the hydraulic cylinder 22 to open the vehicle cover 20 is supplied. In this way, the releasing of the latch 24 occurs before the hydraulic cylinder 22 moves, i.e., the exerting of the opening force by the hydraulic cylinder 22 occurs after the latch 24 is opened such that the vehicle cover 20 can be opened efficiently.

Once the second latch element 72 of the vehicle cover 20 has separated from the first latch element 70 of the vehicle body 16, it is acceptable to release the latch cylinder 71 and allow the movable element 76 to move upward in response to the biasing force of the spring 71a. Alternatively, the latch cylinder 71 can be driven until the vehicle cover 20 reaches the open position and the hydraulic pump HP is stopped. When the open position is reached and the hydraulic pump HP is stopped, the vehicle cover 20 will be supported by the support cable 66 and it is no longer necessary for the hydraulic cylinder 22 and the latch cylinder 71 to exert a force. The hydraulic circuit 28 is conventional, except as explained and illustrated herein. Specifically, the hydraulic circuit is conventional, except that the latch 24 is opened with less force than the hydraulic cylinder 22. Thus, the hydraulic circuit 28 will not be explained in detail here.

The hydraulic circuit basically includes the hydraulic pump HP driven by the motor M, which supplies hydraulic fluid to the latch 24 and the hydraulic cylinder 22, and a 4-way 2 position solenoid valve (control valve) CV. Preferably, a manual pump MP is provided for use in the event of a power loss to the motor M. Optionally, other hydraulic circuit parts may also be included such as a filter, one or more drains or reservoirs, check valves, and various other flow regulators. The hydraulic circuit 28 will not be discussed in further detail herein, except as related to the instant invention.

Figure 8:
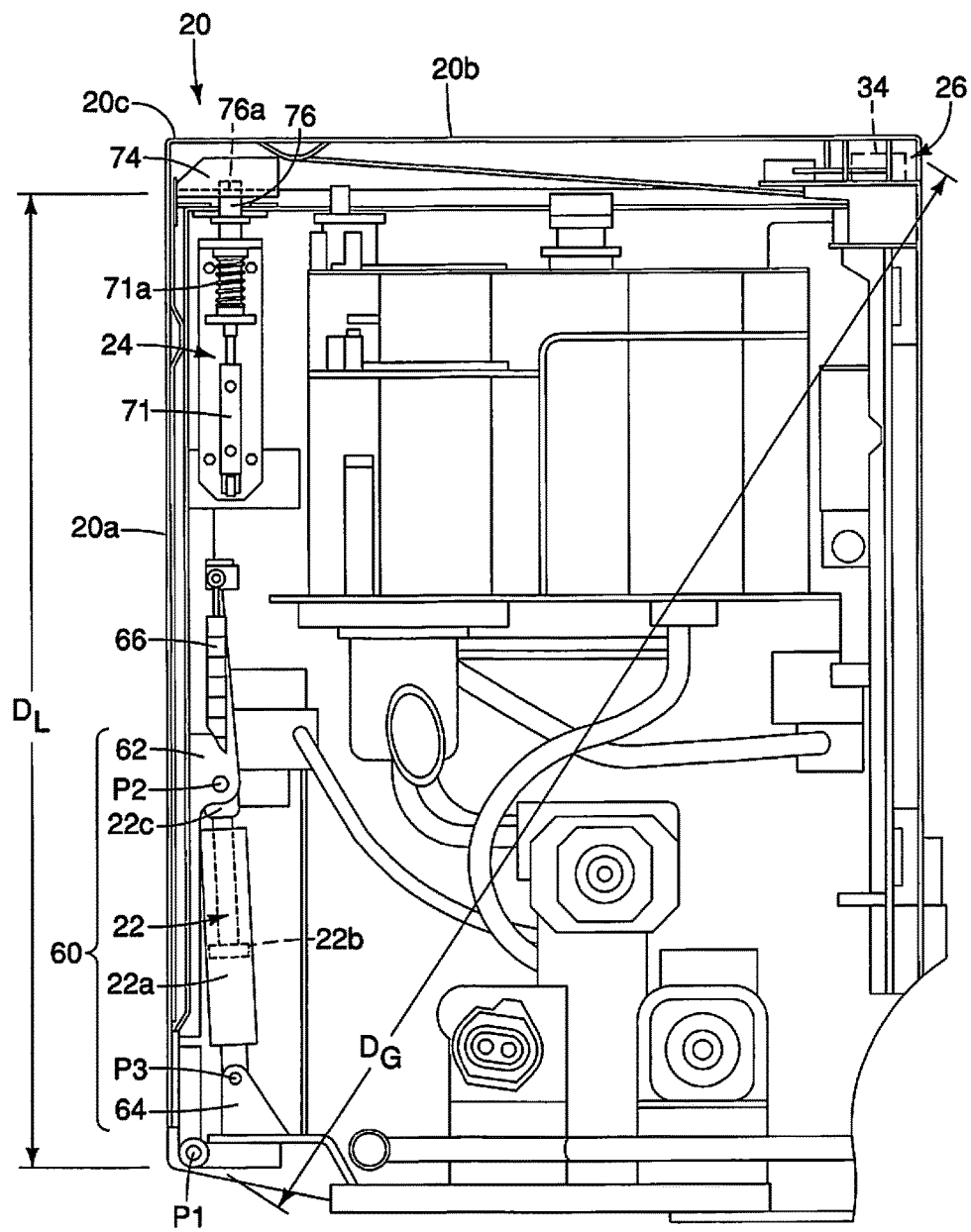
FIG. 8 is an enlarged partial front elevational view of the vehicle body illustrated in FIGS. 1-7, with the vehicle cover in the closed position and with portions broken away to show the latch in the latched position.
Figure 9:
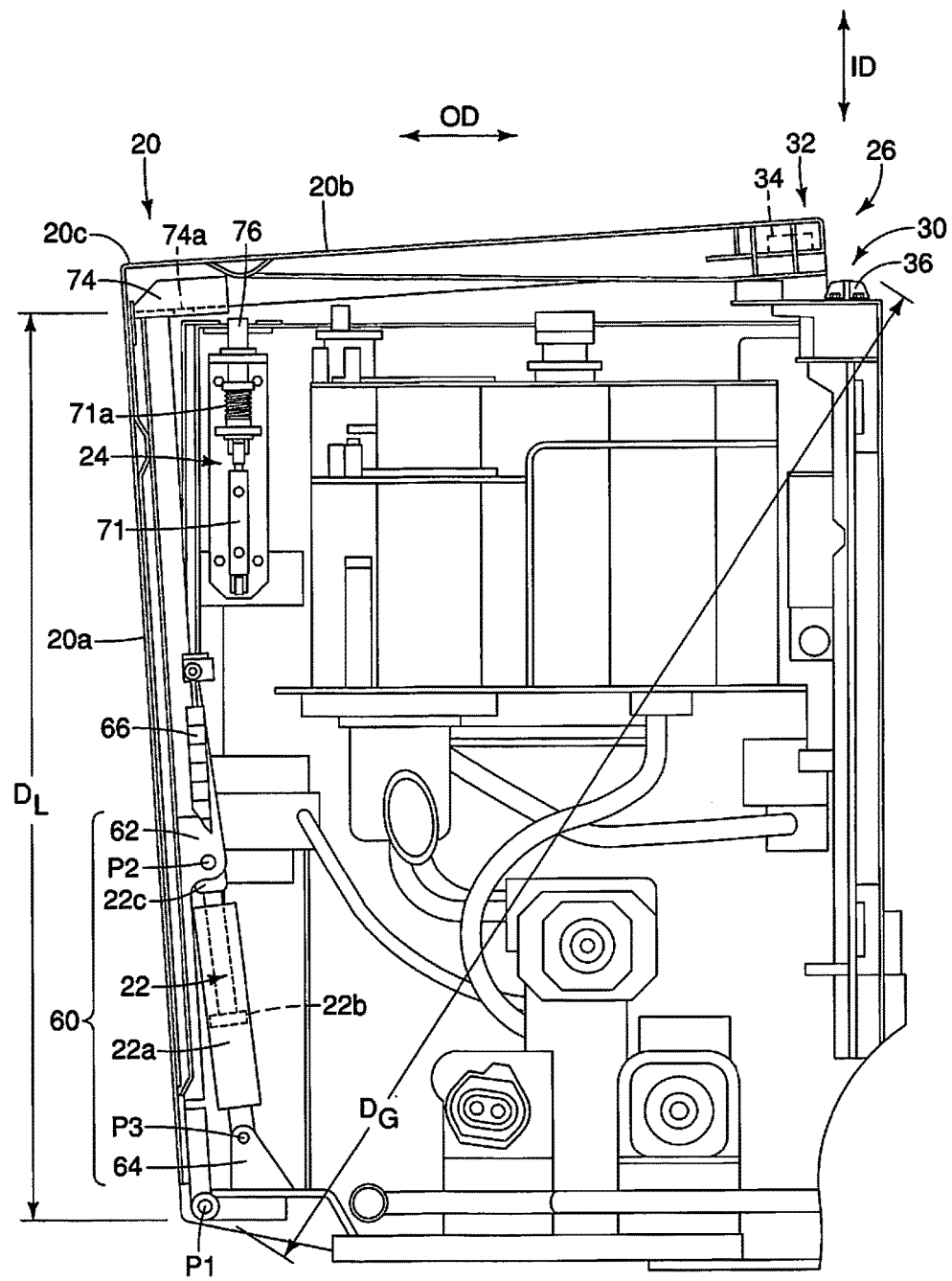
FIG. 9 is an enlarged partial front elevational view of the vehicle body illustrated in FIGS. 1-7, with the vehicle cover in a slightly open position and with portions broken away to show the latch in the unlatched position.
Figure 10:
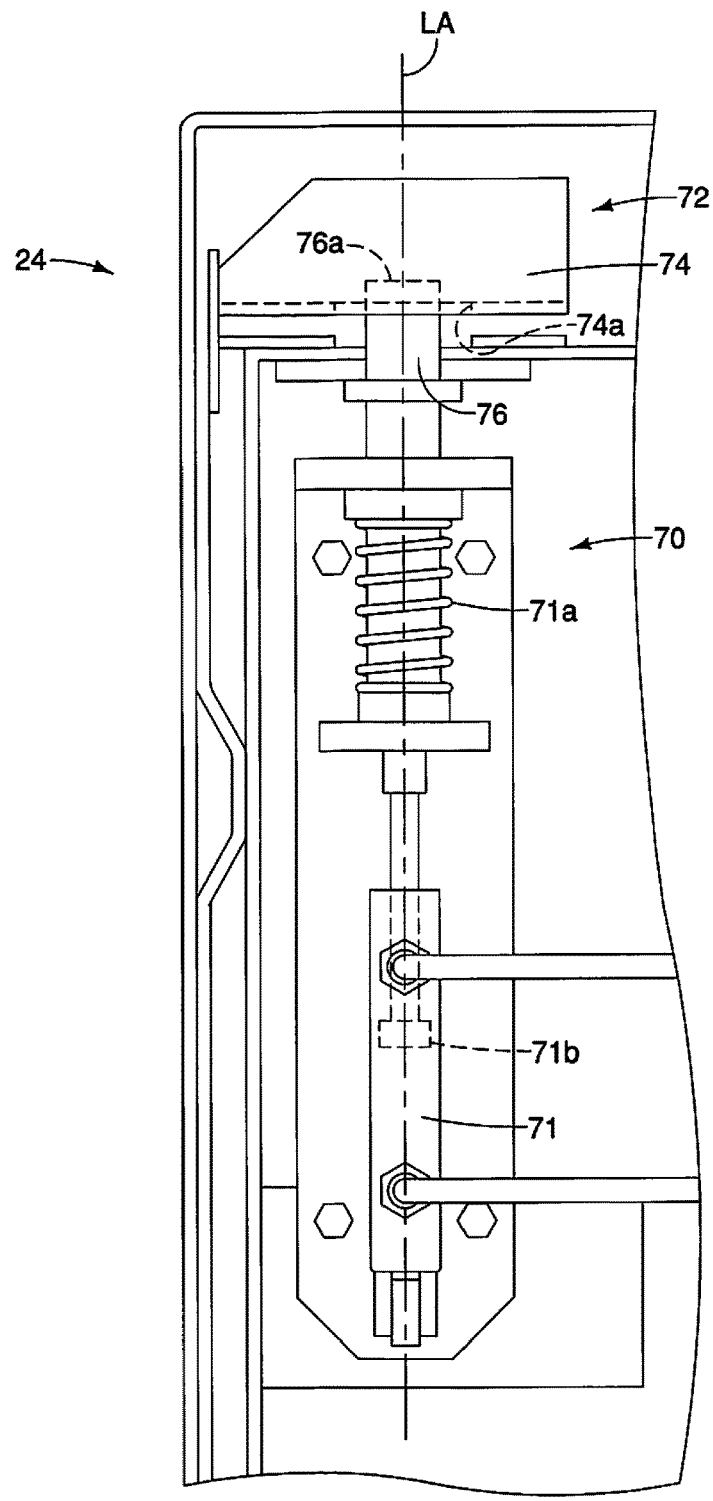
FIG. 10 is an enlarged front elevational view of the latch illustrated in FIGS. 8-9, with the latch in the latched position.

Referring to FIGS. 8-9, in the illustrated embodiment, the latch 24 is disposed closer to the first pivot axis P1 of the vehicle cover 20 than the guides 26. More specifically, in a front view or a rear view of the work vehicle 10, a distance DL from the latch 24 to the first pivot axis P1 is smaller than a distance DG from the guides 26 to the first pivot axis P1. More particularly, in the illustrated embodiment, the latch 24 is disposed almost directly above the first pivot axis P1 while the guides 26 are located diagonally above and rightward from the first pivot axis P1. Thus, the hydraulic cylinder 22 and the latch cylinder 71 are disposed on the same side of the vehicle cover 20 (i.e., the left side in the illustrated embodiment) while the guides 26 are arranged on the opposite side of the vehicle cover 20 with respect to the opening direction OD (widthwise direction of the work vehicle 10 in the illustrated embodiment). In this way, any misalignment of the vehicle cover 20 affects the alignment of the latch 24 less than if the latch 24 were arranged farther from the first pivot axis P1. Also, the hydraulic cylinder 22, the latch cylinder 71, the hydraulic pump 28, and other portions of the hydraulic circuit 28 can be consolidated closer together.

Many parts of the work vehicle are conventional components that are well known in the work vehicle field. Since these components are well known in the work vehicle field, these structures will not be discussed or illustrated in detail herein, except as related to the invention set forth in the following claims.

As used herein, the following directional terms "forward, rearward, above, downward, vertical, horizontal, below and transverse" as well as any other similar directional terms refer to those directions of a work vehicle on a level surface. Accordingly, these terms, as utilized to describe the present invention should be interpreted relative to a work vehicle equipped with the present invention. The terms of degree such as "substantially", "about" and "approximately" as used herein mean a amount of deviation of the modified term such that the end result is not significantly changed.

While only selected embodiments have been chosen to illustrate the present invention, it will be apparent to those skilled in the work vehicle field from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A work vehicle comprising:
   a ground propulsion apparatus;
   a chassis supported by the ground propulsion apparatus;
   a vehicle body supported by the chassis, the vehicle body supporting at least one serviceable component;
   a vehicle cover movably mounted to the vehicle body to move between a closed position and an open position, the vehicle cover covering the at least one serviceable component in the closed position, and the vehicle cover permitting access to the at least one serviceable component in the open position; and
   a guide including a first guide element attached to the vehicle body and a second guide element attached to the vehicle cover, the first and second guide elements cooperating with each other to guide the vehicle cover to an aligned location in the closed position,
   one of the first and second guide elements including a pair of inclined guide surfaces facing in each other to form a receiving space therebetween, and the other of the first and second guide elements including a roller, the roller moving along an insertion direction into the receiving space when the vehicle cover is moved to the closed position, and
   at least one of the inclined guide surfaces being adjustable along an adjustment direction perpendicular to the insertion direction relative to the other of the inclined guide surfaces to adjust a position of the roller relative to the inclined surfaces along the insertion direction in the aligned location.

2. The work vehicle according to claim 1, wherein the first guide element includes the pair of inclined guide surfaces, and the second guide element includes the roller.

3. The work vehicle according to claim 1, wherein the inclined guide surfaces are adjustable along the adjustment direction to adjust a position of the roller along the adjustment direction in the aligned location.

4. The work vehicle according to claim 3, wherein the vehicle cover is pivotally mounted to the vehicle body to pivot about a longitudinally extending pivot axis to pivot between the closed position and the open position, and
   the adjustment direction is parallel to the longitudinally extending pivot axis.

5. The work vehicle according to claim 1, further comprising
   an additional guide including additional first and second guide elements cooperating with each other to guide the vehicle cover to the aligned location in the closed position,
   one of the additional first and second guide elements including at least one additional inclined guide surface, and the other of the additional first and second guide elements including an additional roller.

6. The work vehicle according to claim 1, further comprising
   a latch that releasably holds the vehicle cover in the closed position.

7. The work vehicle according to claim 6, wherein
   the latch includes a first latch element attached to the vehicle body and a second latch element attached to the vehicle cover, the first and second latch elements cooperating with each other to releasably hold the vehicle cover in the closed position,
   one of the first and second latch elements includes a latch plate with an opening, and the other of the first and second latch elements includes a movable element, and
   the movable element includes a retaining end received in the opening in a latched position, and moved out of the opening in a release position.

8. The work vehicle according to claim 7, wherein the movable element of the latch is movable along a latch axis passing through the opening when the vehicle cover is in the closed position.

9. The work vehicle according to claim 8, wherein the first latch element includes the movable element, and the second latch element includes the latch plate with the opening.

10. The work vehicle according to claim 9, wherein the latch axis extends vertically.

11. The work vehicle according to claim 8, wherein the latch axis extends vertically.

12. The work vehicle according to claim 6, further comprising
    an opening and closing structure arranged and configured to move the vehicle cover between the open and closed positions.

13. The work vehicle according to claim 6, wherein the vehicle cover is pivotally mounted to the vehicle body to pivot about a longitudinally extending pivot axis between the closed position and the open position, and
    the latch is disposed closer to the longitudinally extending pivot axis than the guide.

14. A work vehicle comprising:
    a ground propulsion apparatus;
    a chassis supported by the ground propulsion apparatus;
    a vehicle body supported by the chassis, the vehicle body supporting at least one serviceable component;
    a vehicle cover movably mounted to the vehicle body to move between a closed position and an open position, the vehicle cover covering the at least one serviceable component in the closed position, and the vehicle cover permitting access to the at least one serviceable component in the open position; and
    a guide including a first guide element attached to the vehicle body and a second guide element attached to the vehicle cover, the first and second guide elements cooperating with each other to guide the vehicle cover to an aligned location in the closed position,
    one of the first and second guide elements including a pair of inclined guide surfaces facing in each other to form a receiving space therebetween, and the other of the first and second guide elements including a roller, the roller moving along an insertion direction into the receiving space when the vehicle cover is moved to the closed position, and
    the inclined guide surfaces being adjustable along an adjustment direction perpendicular to the insertion direction to adjust a position of the roller along the adjustment direction in the aligned location.

15. The work vehicle according to claim 14, wherein the first guide element includes the pair of inclined guide surfaces, and the second guide element includes the roller.

16. The work vehicle according to claim 14, wherein
the vehicle cover is pivotally mounted to the vehicle body to pivot about a longitudinally extending pivot axis between the closed position and the open position, and
the adjustment direction is parallel to the longitudinally extending pivot axis.

17. A work vehicle comprising:
a ground propulsion apparatus;
a chassis supported by the around propulsion apparatus;
a vehicle body supported by the chassis, the vehicle body supporting at least one serviceable component;
a vehicle cover movably mounted to the vehicle body to move between a closed position and an open position, the vehicle cover covering the at least one serviceable component in the closed position, and the vehicle cover permitting access to the at least one serviceable component in the open position;
a guide including a first guide element attached to the vehicle body and a second guide element attached to the vehicle cover, the first and second guide elements cooperating with each other to guide the vehicle cover to an aligned location in the closed position;
a latch that releasable holds the vehicle cover in the closed position; and
an opening and closing structure arranged and configured to move the vehicle cover between the open and closed positions,
one of the first and second guide elements including at least one inclined guide surface, and the other of the first and second guide elements including a roller, and
the opening and closing structure and the latch being operatively coupled to each other so that the latch releases the vehicle cover when the opening and closing structure moves from the closed position toward the open position.

18. A work vehicle comprising:
a ground propulsion apparatus;
a chassis supported by the ground propulsion apparatus;
a vehicle body supported by the chassis, the vehicle body supporting at least one serviceable component;
a vehicle cover movably mounted to the vehicle body to move between a closed position and an open position, the vehicle cover covering the at least one serviceable component in the closed position, and the vehicle cover permitting access to the at least one serviceable component in the open position; and
a guide including a first guide element attached to the vehicle body and a second guide element attached to the vehicle cover, the first and second guide elements cooperating with each other to guide the vehicle cover to an aligned location in the closed position,
the second guide element moving along a direction to an alignment position relative to the first guide element when the vehicle cover is moved to the aligned location in the closed position, and at least one of the first and second guide elements being adjustable to adjust the alignment position of the second guide element relative to the first guide element along the direction.

* * * * *